(12) United States Patent
Ataka et al.

(10) Patent No.: US 11,458,695 B2
(45) Date of Patent: Oct. 4, 2022

(54) AUTOMATED FIBER BUNDLE PLACEMENT APPARATUS

(71) Applicant: TSUDAKOMA KOGYO KABUSHIKI KAISHA, Ishikawa-ken (JP)

(72) Inventors: Takeshi Ataka, Ishikawa-ken (JP); Shota Tonoki, Ishikawa-ken (JP)

(73) Assignee: TSUDAKOMA KOGYO KABUSHIKI KAISHA, Ishikawa-ken (JP)

( * ) Notice: Subject to any disclaimer, the term of this patent is extended or adjusted under 35 U.S.C. 154(b) by 0 days.

(21) Appl. No.: 17/357,263

(22) Filed: Jun. 24, 2021

(65) Prior Publication Data

US 2022/0024157 A1 Jan. 27, 2022

(30) Foreign Application Priority Data

Jul. 22, 2020 (JP) .............................. JP2020-125326

(51) Int. Cl.
*B29C 70/38* (2006.01)
*B29C 70/54* (2006.01)

(52) U.S. Cl.
CPC ............ *B29C 70/384* (2013.01); *B29C 70/54* (2013.01)

(58) Field of Classification Search
CPC ..... B29C 70/38; B29C 70/382; B29C 70/384; B29C 70/386; B29C 70/388; B29C 70/54; B29C 70/546; B29C 70/547
See application file for complete search history.

(56) References Cited

U.S. PATENT DOCUMENTS

| 2007/0044919 A1* | 3/2007 | Hoffmann | ............. B29C 70/384 |
| | | | 156/430 |
| 2008/0216963 A1 | 9/2008 | Hamlyn et al. | |
| 2016/0114540 A1 | 4/2016 | Hamlyn et al. | |
| 2019/0077094 A1* | 3/2019 | Hamlyn | ................ B26D 1/065 |

FOREIGN PATENT DOCUMENTS

| EP | 0493739 A1 | 7/1992 |
| JP | 2019-130914 A | 8/2019 |

OTHER PUBLICATIONS

Jan. 12, 2022, European Search Report issued for related EP Application No. 21182435.4.

* cited by examiner

*Primary Examiner* — George R Koch
(74) *Attorney, Agent, or Firm* — Paratus Law Group, PLLC

(57) ABSTRACT

An automated fiber bundle placement apparatus including a placing head configured to place each of fiber bundles onto a placement die and including a plurality of conveying mechanisms each configured to convey the fiber bundle toward a pressing part configured to press the fiber bundles onto the placement die, a plurality of guidance mechanisms each including a guide roller for guiding the fiber bundle toward the conveying mechanism, and a frame attached to a multi-jointed robot configured to move the placing head and provided with the conveying mechanisms and the guidance mechanisms. The frame is constituted by a main frame part provided with the conveying mechanisms and attached to the multi-jointed robot and a sub-frame part provided with the guidance mechanisms and detachably attached to the main frame part.

4 Claims, 8 Drawing Sheets

VERTICAL DIRECTION

FRONT AND REAR DIRECTION
OF PLACING HEAD

AUTOMATED FIBER BUNDLE PLACEMENT APPARATUS

CROSS-REFERENCE TO RELATED APPLICATION

The present application claims priority from Japanese Patent Application No. 2020-125326, filed on Jul. 22, 2020, the entire subject matter of which is incorporated herein by reference.

TECHNICAL FIELD

The present invention relates to an automated fiber bundle placement apparatus including a supply device which a plurality of bobbins each having a fiber bundle wound thereon is mounted thereto and is configured to deliver the fiber bundle from each of the bobbins, a placing head configured to perform placement of each of the fiber bundles supplied from the supply device onto a placement die and having a pressing part configured to press the fiber bundles onto the placement die, a multi-jointed robot which the placing head is attached thereto and is configured to move the placing head for the placement, and a guide mechanism provided for the multi-jointed robot and configured to guide the fiber bundles from the supply device toward the placing head, wherein the placing head includes a plurality of conveying mechanisms each provided on each of paths of the fiber bundles so as to convey the fiber bundles introduced into the placing head toward the pressing part, a plurality of guidance mechanisms each including a guide roller for guiding the fiber bundle toward the conveying mechanism and each provided on each path on an upstream side of the path to the conveying mechanism, and a frame attached to the multi-jointed robot and provided with the conveying mechanisms and the guidance mechanisms.

BACKGROUND ART

As an automated fiber bundle placement apparatus, known is an AFP (Automated Fiber Placement) apparatus configured to place a thin fiber bundle onto a placement die. Note that, as used herein, the "fiber bundle" indicates a material such as a so-called tow prepreg formed into a tape shape by impregnating a matrix resin in a bundle of a plurality of reinforced fibers (carbon fibers, glass fibers and the like). As the AFP apparatus, there is an apparatus configured to place a fiber bundle onto a placement die by using a multi-jointed robot.

JP2019-130914A discloses, as the AFP apparatus, an apparatus including an unwinding mechanism configured to unwind (deliver) fiber bundles from bobbins on which the fiber bundles are wound, a sticking head as a placing head for performing the placement, a multi-jointed robot to which the sticking head is attached, and a guide mechanism configured to guide the fiber bundles from the unwinding mechanism toward the sticking head. In the AFP apparatus of JP2019-130914A, the sticking head has a roller as a pressing part for pressing the fiber bundles onto a surface to be attached (onto the placement die), a pressing member such as a shoe, and a feeder as a conveying mechanism configured to convey the fiber bundles toward the pressing member.

Note that, JP2019-130914A discloses the AFP apparatus configured to perform the placement for a single (one) fiber bundle. However, there is a known AFP apparatus configured to perform the placement for a plurality of fiber bundles. In the AFP apparatus configured to perform the placement for the plurality of fiber bundles, the conveying mechanism of the placing head is provided for each of the plurality of fiber bundles.

As the placing head of the AFP apparatus, known is a placing head having a guide roller configured to guide a fiber bundle toward a conveying mechanism and provided on an upstream side of a path of the fiber bundle to the conveying mechanism. More specifically, for example, as disclosed in Japanese Patent Application No. 2020-083220 filed by the present applicant, the placing head has guide rollers each provided on each path in a form corresponding to the path of each fiber bundle. The placing head has, in addition to the guide rollers, conveying rollers and S-shaped guides provided in a form corresponding to each guide roller where the conveying rollers are provided above the guide rollers (on the upstream sides of the paths) and the S-shaped guides are provided above the conveying rollers.

In this way, each fiber bundle is guided toward the conveying mechanism via the S-shaped guide, the conveying roller and the guide roller in corresponding order. In other words, the placing head has a plurality of mechanisms (guidance mechanisms) configured to guide the fiber bundles and each provided on each path of the fiber bundles, as a mechanism including the S-shaped guide, the conveying roller and the guide roller.

SUMMARY OF INVENTION

In the meantime, for the placing head as described above, maintenance on the conveying mechanism may be performed so as to remove a clogged state of the fiber bundle, to clean an inside of the placing head, and the like. For the maintenance, it is necessary to make a state where an operator can perform an operation on the conveying mechanism in the placing head, specifically, a state where a space connecting to the conveying mechanism is opened to an outside.

However, since a plurality of devices and mechanisms are present around the conveying mechanisms in the placing head and a cable and a pipeline connected to the devices and the like are also present around the placing head, it is difficult to laterally open the inside of the placing head. In the meantime, as described above, the guidance mechanisms including the guide rollers and the like are provided above the conveying mechanisms. However, only the guidance mechanisms are provided above the conveying mechanisms because the fiber bundles should be guided. Therefore, the space above the conveying mechanisms can be opened to an outside by removing the plurality of guidance mechanisms each provided for each fiber bundle.

However, as described above, each guidance mechanism includes a member such as the guide roller configured to guide the fiber bundle. In the plurality of guidance mechanisms included in the placing head, each member is provided in a form of being supported individually or separately for each type or the like. For this reason, when removing the plurality of guidance mechanisms from the placing head for the maintenance, it is necessary to remove each member provided in such form and to again attach the same after the maintenance. As a result, a maintenance operation including the maintenance and an operation associated with the maintenance becomes complicated as a whole, requires much time and imposes a burden on the operator.

The present invention has been made in view of the above situations, and an object thereof is to provide a configuration of a placing head capable of facilitating the maintenance operation in an automated fiber bundle placement apparatus configured to place a plurality of fiber bundles onto a placement die.

A preamble of the present invention is an automated fiber bundle placement apparatus including a supply device which a plurality of bobbins each having a fiber bundle wound thereon is mounted thereto and is configured to deliver the fiber bundle from each of the bobbins, a placing head configured to perform placement of each of the fiber bundles supplied from the supply device onto a placement die and having a pressing part configured to press the fiber bundles onto the placement die, a multi-jointed robot which the placing head is attached thereto and is configured to move the placing head for the placement, and a guide mechanism provided for the multi-jointed robot and configured to guide the fiber bundles from the supply device toward the placing head, wherein the placing head includes a plurality of conveying mechanisms each provided on each of paths of the fiber bundles so as to convey the fiber bundles introduced into the placing head toward the pressing part, a plurality of guidance mechanisms each including a guide roller for guiding the fiber bundle toward the conveying mechanism and each provided on each path on an upstream side of the path to the conveying mechanism, and a frame attached to the multi-jointed robot and provided with the conveying mechanisms and the guidance mechanisms.

In order to achieve the above object, the automated fiber bundle placement apparatus of the preamble of the present invention is characterized in that the frame is constituted by a main frame part provided with the conveying mechanisms and attached to the multi jointed robot and a sub-frame part provided with the guidance mechanisms and detachably attached to the main frame part.

In the automated fiber bundle placement apparatus of the present invention, a holding mechanism provided to hold the sub-frame part between the guide mechanism and the placing head in a vertical direction may be provided. In the automated fiber bundle placement apparatus, in a case where the placing head is attached to the multi-jointed robot via a rotation mechanism including a rotary part configured to rotationally drive and having the placing head attached thereto, the holding mechanism may include a holding unit configured to hold the sub-frame part and a support unit configured to support the holding unit with respect to the multi-jointed robot, and the holding unit may be attached to the support unit so as to be rotatable around an axis line in the vertical direction. The sub-frame part may have a handle unit fir an operator to grip with a hand.

According to the automated fiber bundle placement apparatus of the present invention, the frame of the placing head is constituted by the main frame part attached to the multi-jointed robot and the sub-frame part detachably attached to the main frame part. The sub-frame part of the frame is provided with all the guidance mechanisms. Therefore, during the maintenance operation, the guidance mechanisms can be attached and detached with respect to the placing head simply by attaching and detaching the sub-frame part with respect to the main frame part. In this way, the maintenance operation can be easily performed.

Further, the automated fiber bundle placement apparatus includes the holding mechanism provided to hold the sub-frame part between the guide mechanism and the placing head in the vertical direction, so that the maintenance operation can be performed more easily. Specifically, according to the present invention, during the maintenance operation, the sub-frame part is removed from the main frame part of the placing head. In order to perform the maintenance operation, it is necessary to locate (hold) the sub-frame part in a position (retreat position) spaced from the main frame part. In a case where there is no means for holding the sub-frame part in the retreat position, the operator should grip and hold the sub-frame part with a hand. Specifically, in this case, the maintenance operation should be performed by two persons.

Even when there is a means fix holding the sub-frame part, if the means is a holding device such as a movable stand provided separately from the automated fiber bundle placement apparatus, it is necessary to move the holding device to the vicinity of the automated fiber bundle placement apparatus each time the maintenance operation is performed and to return the holding device to an original position after the maintenance is completed. Further, in some cases, the holding device cannot be moved to the vicinity of the placing head, depending on a configuration around the multi jointed robot of the automated fiber bundle placement apparatus, a configuration of the holding device, and the like. In this case, the sub-frame part should be moved to a holding part of the holding device in a position spaced from the sub-frame part, so that it is troublesome to move the sub-frame part.

In contrast, the automated fiber bundle placement apparatus includes the holding mechanism as described above, so that, during the maintenance operation, the sub-frame part removed from the main frame part of the placing head can be held by the holding mechanism. In this way, during the maintenance, it is not necessary for the operator to grip and hold the sub-frame part with a hand, so that the maintenance operation can be performed by one person. Further, since the holding mechanism is provided to the automated fiber bundle placement apparatus and is provided to hold the sub-frame part between the guide mechanism and the placing head in the vertical direction, specifically, in the vicinity of a path of the fiber bundle from the guide mechanism to the placing head, the sub-frame part can be more easily moved to a holding part of the holding mechanism, as compared to the holding device provided separately from the automated fiber bundle placement apparatus.

As described above, the automated fiber bundle placement apparatus includes the holding mechanism as described above, so that movement of the sub-frame part associated with the maintenance can be easily performed by one operator. In this way, it is possible to facilitate the maintenance operation including movement of the sub-frame part.

In the automated fiber bundle placement apparatus including the holding mechanism as described above, the holding mechanism includes the holding unit configured to hold the sub-frame part and the support unit configured to support the holding unit with respect to the multi-jointed robot, and the holding unit is attached to the support unit so as to be rotatable around the axis line in the vertical direction. In this way, it is possible to prevent the fiber bundle from being damaged as the sub-frame part is held by the holding mechanism. This is specifically described, as follows.

As the automated fiber bundle placement apparatus, there is an automated fiber bundle placement apparatus where a placing head is attached to a multi-jointed robot via a rotation mechanism and the placing head is rotationally driven by the rotation mechanism. In this configuration, when the holding mechanism is configured to face toward a specific direction, a direction of the holding mechanism and a direction of the placing head may be different from each other in a still state of the automated fiber bundle placement apparatus.

In this case, when the sub-frame part is moved toward the holding mechanism so as to hold the sub-frame part on the holding mechanism, the path of each fiber bundle is inclined and each fiber bundle is twisted between the guidance mechanism of the sub-frame part and the conveying mechanism of the main frame part in a state where the moved sub-frame part is held on the holding mechanism. Note that, in general, the guide roller of the guidance mechanism and the roller such as the conveying roller each have a collar part for preventing the fiber bundle from deviating from the roller. For this reason, when the fiber bundle is inclined and twisted, as described above, each fiber bundle is pressed against the collar part of the roller that guides the fiber bundle. In particular, since such state is formed in a distance shorter than a path from the guide mechanism to the placing head, each fiber bundle is pressed against the collar part of the roller by strong force. For this reason, the fiber bundle may be damaged depending on a still state (a direction of the placing head) of the automated fiber bundle placement apparatus and a type (a width and the like) of the fiber bundle.

In contrast, as described above, since the holding mechanism is configured such that the holding unit is rotatably attached to the support unit, the direction of the holding unit (holding mechanism) can be matched with the direction of the placing head. In this way, in the state where the sub-frame part is held on the holding mechanism, each fiber bundle can be prevented from being inclined and twisted between the guidance mechanism of the sub-frame part and the conveying mechanism of the main frame part. Therefore, the situation where as the sub-frame part is held on the holding mechanism, the fiber bundle is pressed against the collar part of the roller is solved. As a result, the damage of the fiber bundle, which is caused when the fiber bundle is pressed against the collar part of the roller, is prevented.

Further, when moving the sub-frame part toward the holding mechanism during the maintenance operation, the operator usually grips the sub-frame part with a hand for the movement. Therefore, the handle unit with which the operator grips the sub-frame part with a hand is provided, so that the operator can further facilitate the operation of moving the sub-frame part.

DESCRIPTION OF EMBODIMENTS

Hereinbelow, an embodiment of the automated fiber bundle placement apparatus according to the present invention will be described with reference to FIGS. 1 to 8.

Figure 1:
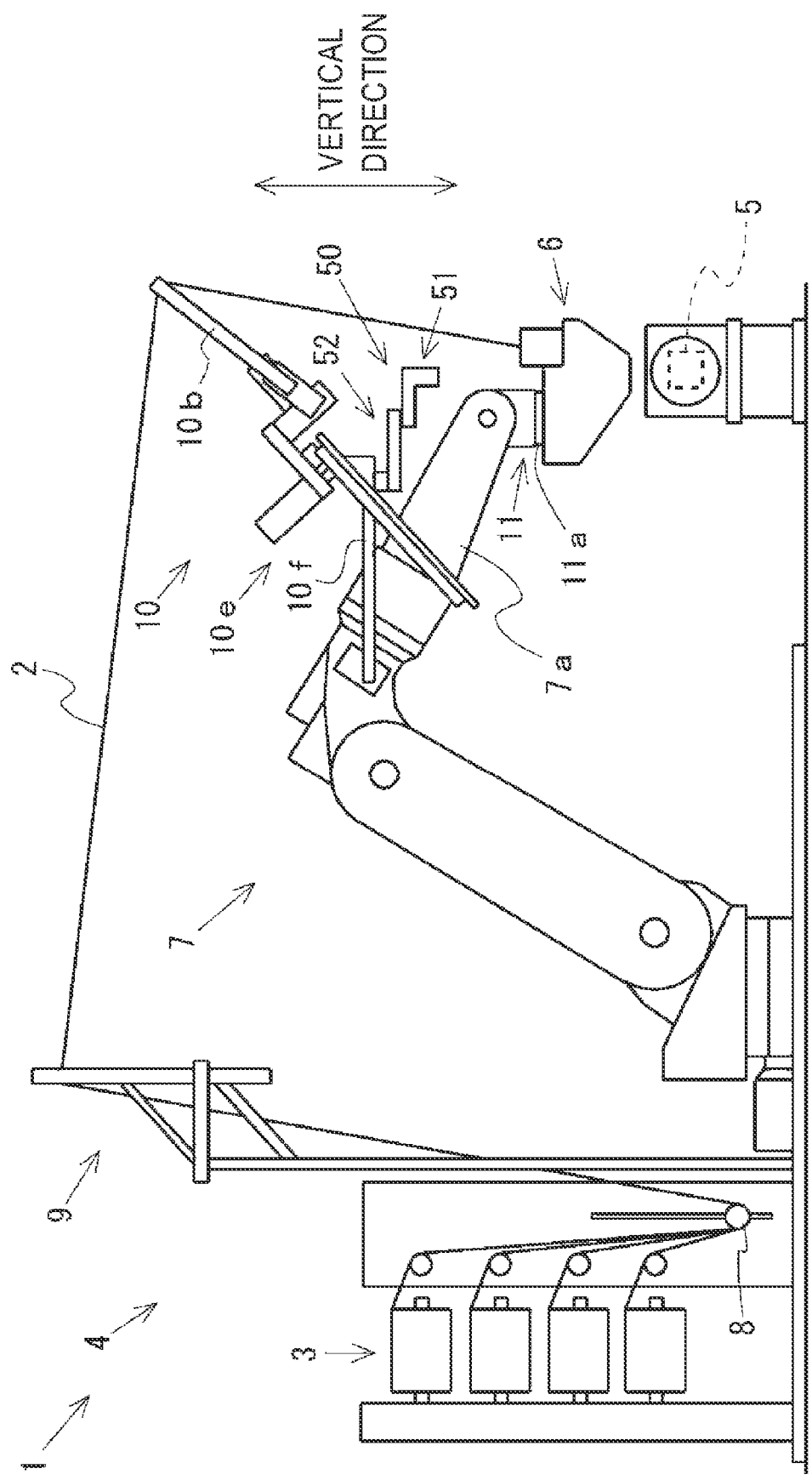
FIG. 1 is a schematic side view showing an example of an automated fiber bundle placement apparatus of the present invention.

As shown in FIG. 1, an automated fiber bundle placement apparatus 1 includes a supply device 4 to which bobbins 3 each having a fiber bundle 2 wound thereon are mounted thereto, a placing head 6 configured to perform placement of the fiber bundles 2 supplied from the supply device 4 onto a placement die 5, and a multi-jointed robot 7 configured to move the placing head 6 for the placement. Note that, in the present embodiment, the automated fiber bundle placement apparatus 1 is configured to perform the placement of the sixteen fiber bundles 2 at the same time. Therefore, although only the four bobbins on a front side are shown in FIG. 1, the sixteen bobbins 3 are mounted to the supply device 4.

The supply device 4 includes a guide unit 9 configured to guide the fiber bundle 2 unwound from each bobbin 3 toward the multi jointed robot 7. The guide unit 9 has a guide member (not shown) provided for each fiber bundle 2 so as to individually guide each fiber bundle 2, and is configured to guide each fiber bundle 2 in a position higher than the multi-jointed robot 7 by the guide member. Note that, the supply device 4 is provided with a dancer roller 8 common to each of the fiber bundles 2, as a configuration for adjusting tension of each fiber bundle 2, in a path of the fiber bundle 2 between each bobbin 3 and the guide unit 9. By the configuration, each fiber bundle 2 is adjusted to have appropriate tension between the bobbin 3 and the guide unit 9, and is pulled toward the multi jointed robot 7 in an appropriate tension state.

A guide mechanism 10 for guiding each fiber bundle 2 guided by the guide unit 9 as described above is attached to the multi-jointed robot 7. The guide mechanism 10 is attached to an arm 7a on a tip end-side of the multi-jointed robot 7. The guide mechanism 10 has a tow guide provided for each fiber bundle 2 so as to individually guide each fiber bundle 2, and each tow guide is supported by a support member 10b.

Figure 2:
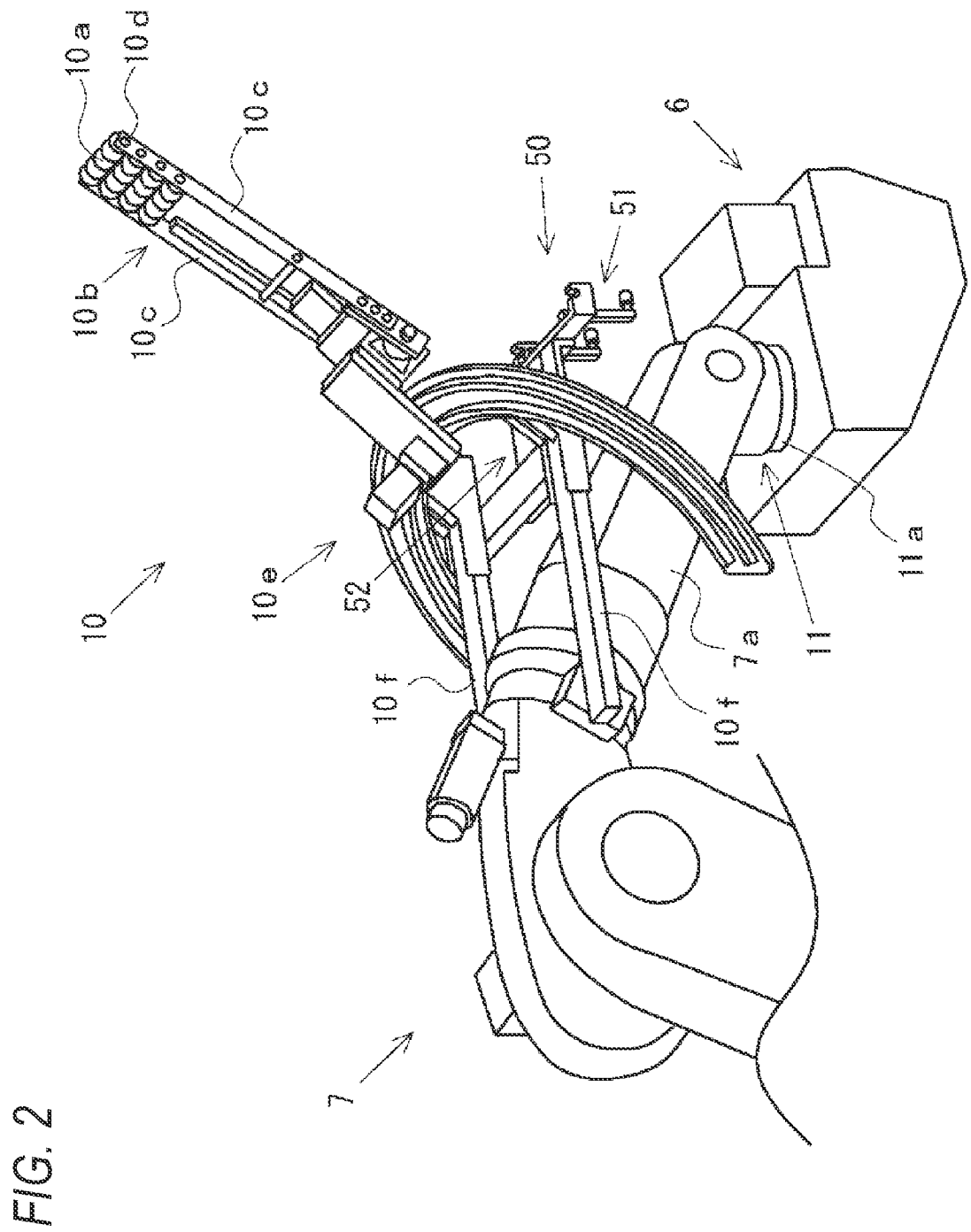
FIG. 2 is a schematic perspective view of a placing head and a guide mechanism shown in FIG. 1.

More specifically, as shown in FIG. 2, the guide mechanism 10 has sixteen tow guides 10a corresponding to each of the fiber bundles 2. In the present embodiment, each tow guide 10a is constituted by a hollow cylindrical member having a collar part. The sixteen tow guides 10a are supported by the support member 10b having a pair of side plates 10c and 10c as a main body. The support member 10b has four support shafts 10d bridged between both the side plates 10c and 10c, and the tow guides 10a are supported in fours by each support shaft 10d. Note that, the tow guides 10a are supported by the support shaft 10d in such a form that the support shaft 10d is inserted in holes of the hollow cylindrical tow guides 10a, and each tow guide 10a can rotate with respect to the support shaft 10d.

The guide mechanism 10 also has a support mechanism 10e configured to support the support member 10b, and is attached at the support mechanism 10e to the multi-jointed robot 7. The guide mechanism 10 is provided such that the support member 10b extends upward above the arm 7a and each fiber bundle 2 is guided on a tip end-side of the support member 10b.

Therefore, in the automated fiber bundle placement apparatus 1, the fiber bundle 2 pulled out from each bobbin 3 is pulled out from the supply device 4 (guide unit 9) in a position higher than the multi jointed robot 7 in a vertical direction, passes above the multi jointed robot 7 and reaches the guide mechanism 10. Each fiber bundle 2 is turned in a form of being guided by the corresponding tow guide 10a of the guide mechanism 10, and is guided to the placing head 6 attached to a tip end of the arm 7a of the multi-jointed robot 7.

Note that, in the present embodiment, the placing head 6 is attached to the arm 7*a* of the multi jointed robot 7 via a rotation mechanism 11. The rotation mechanism 11 has a rotary part 11*a* configured to be rotationally driven, and the placing head 6 is attached to the rotary part 11*a*. In this way, the placing head 6 is provided on the tip end-side of the multi-jointed robot 7 such that it can be rotationally driven by the rotation mechanism 11.

Figure 3:
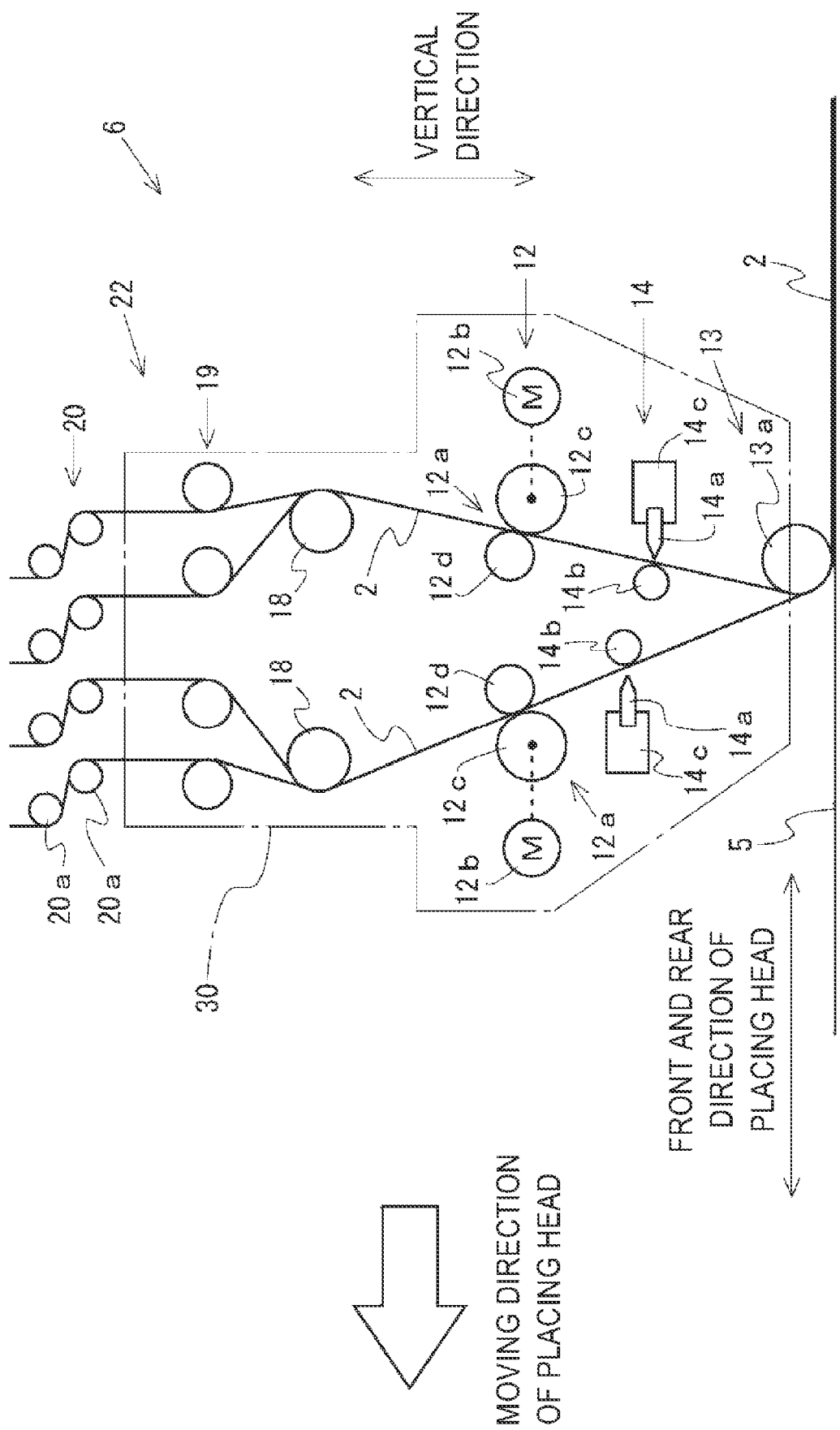
FIG. 3 is a schematic side view of the placing head shown in FIG. 1.
Figure 4:
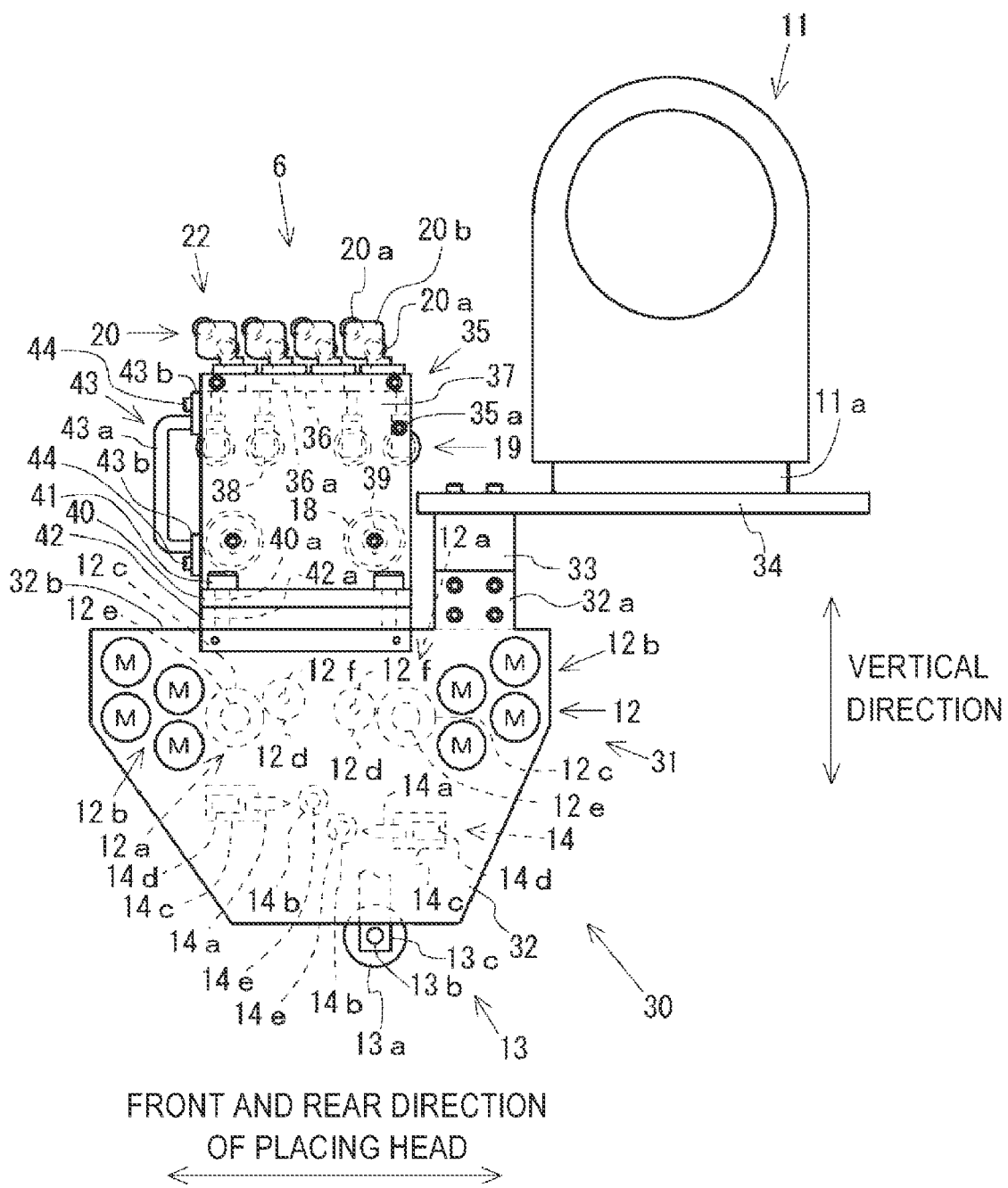
FIG. 4 is a side view showing a main frame part and a sub-frame part constituting a frame of the placing head shown in FIG. 1.
Figure 5:
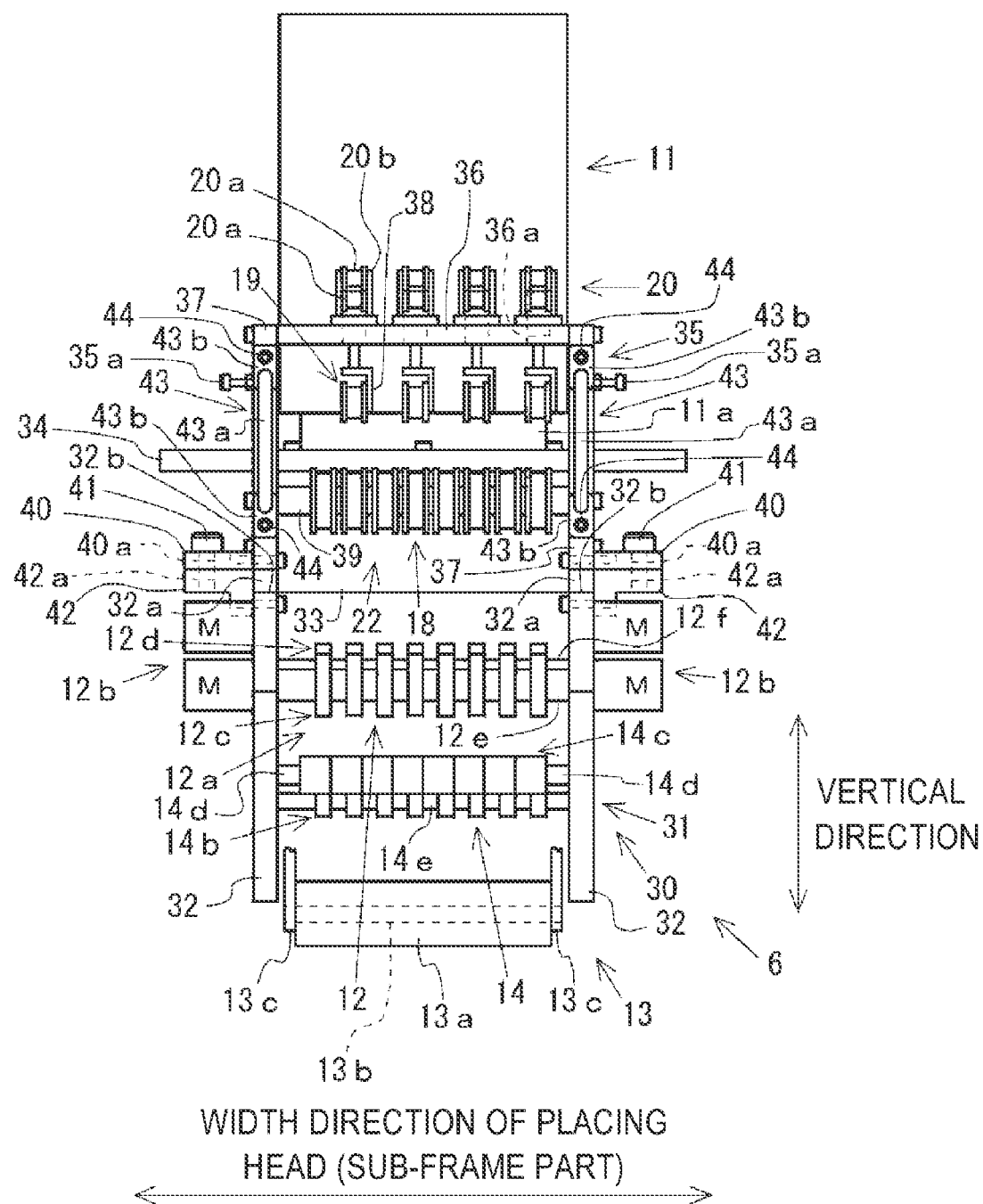
FIG. 5 is a front view of the main frame part and the sub-frame part shown in FIG. 4.
Figure 6:
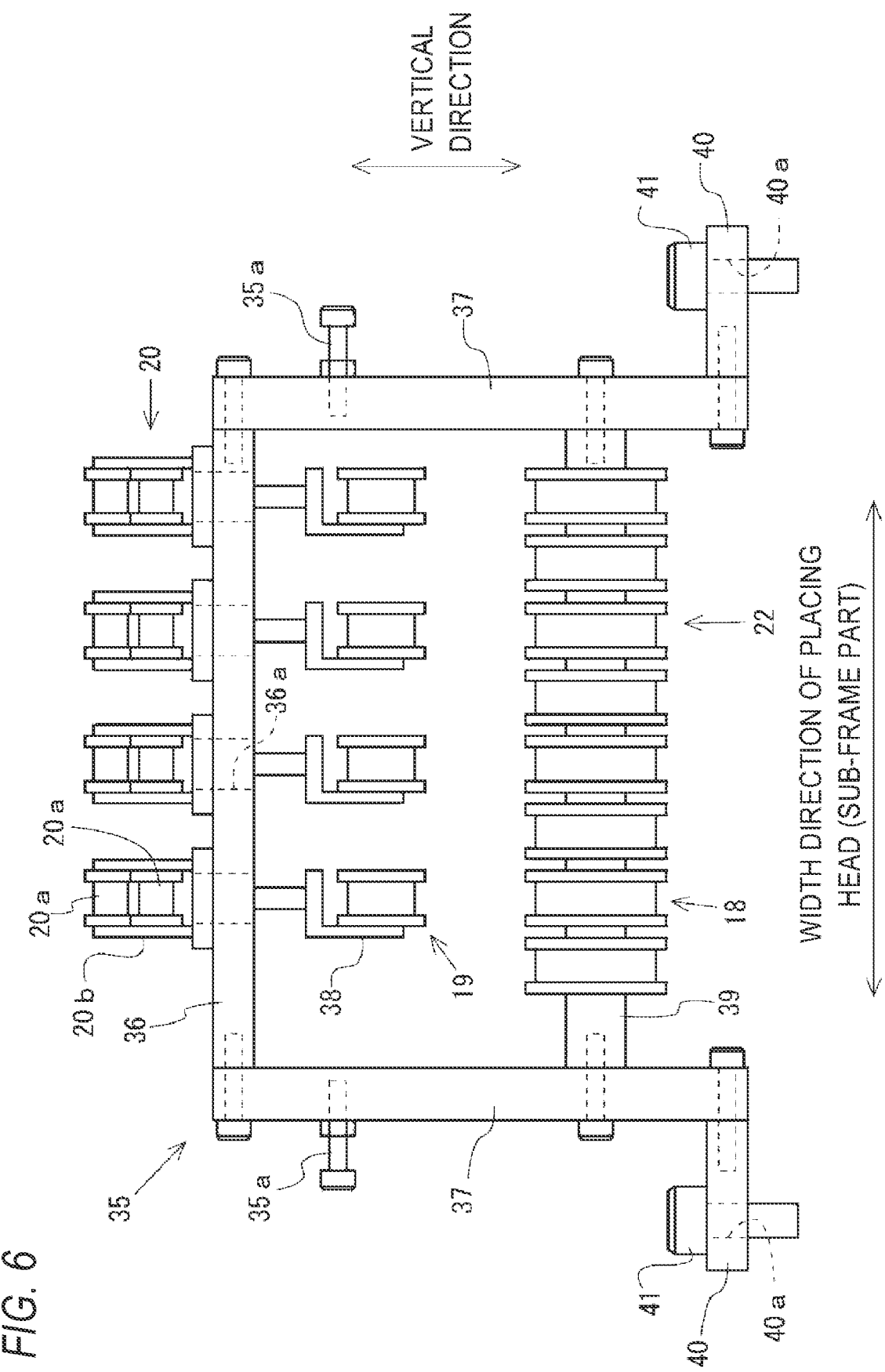
FIG. 6 is a rear view of the sub-frame part shown in FIG. 4.
Figure 7:
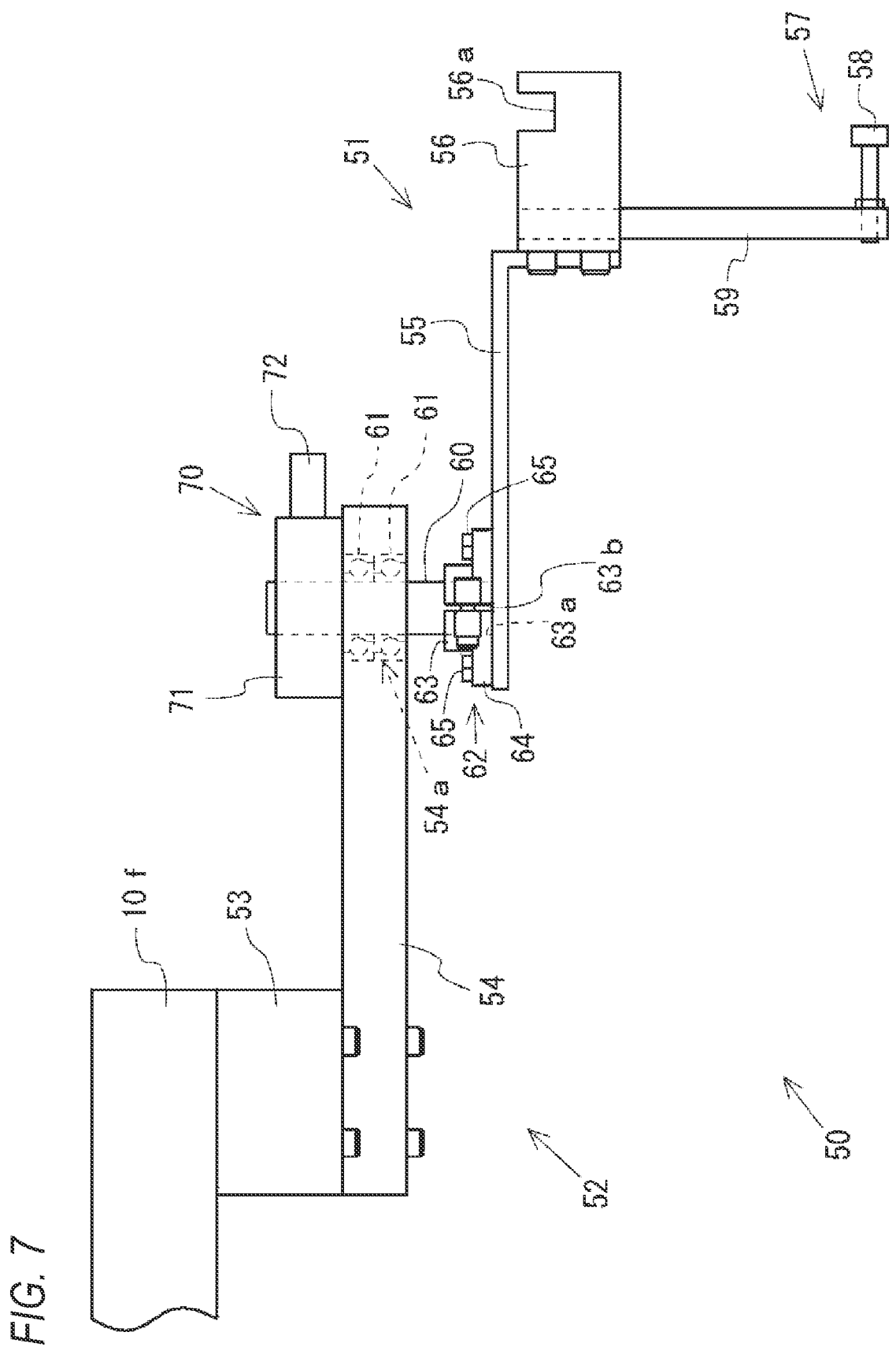
FIG. 7 is a side view of a holding mechanism shown in FIG. 1.
Figure 8:
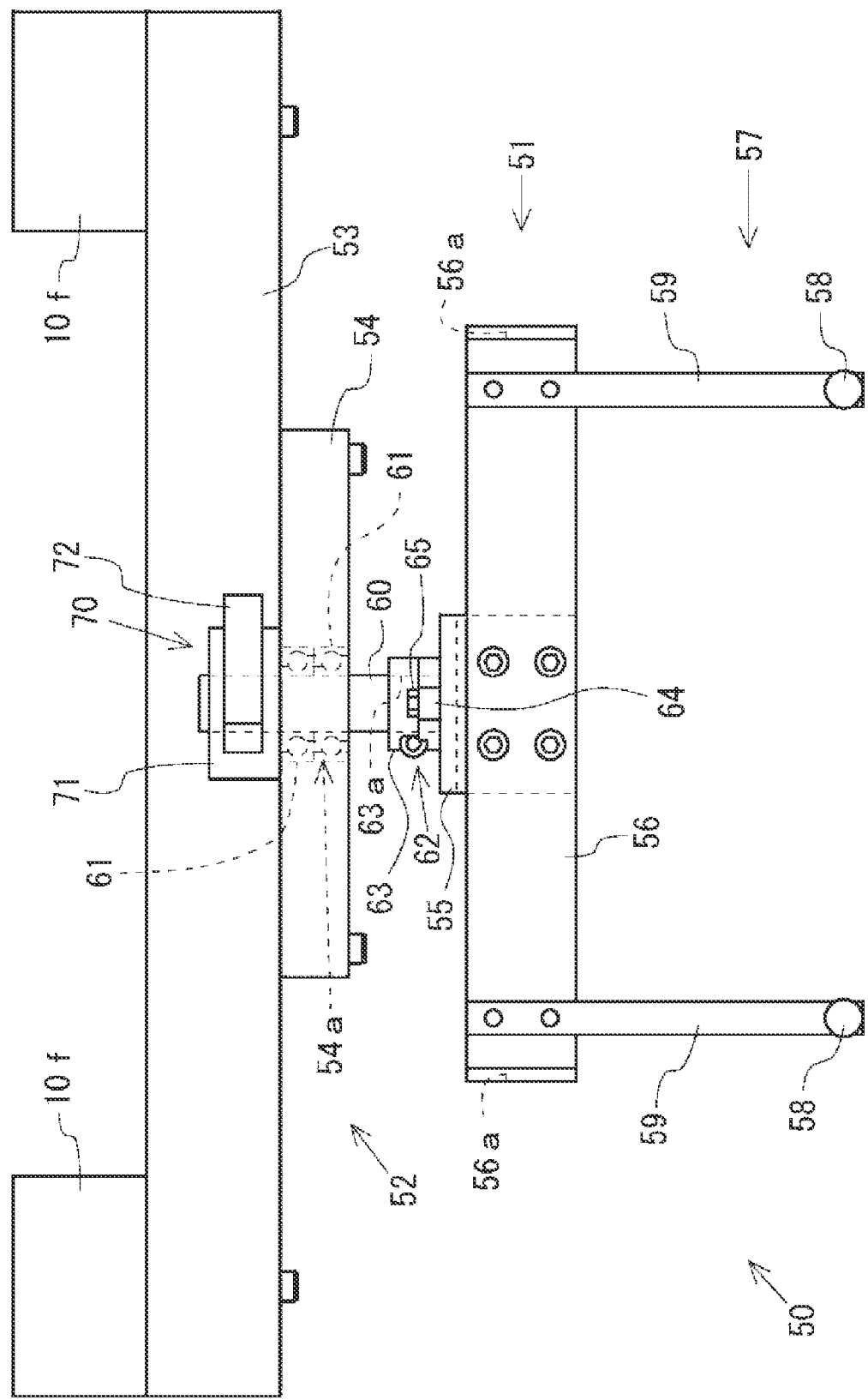
FIG. 8 is a front view of the holding mechanism shown in FIG. 7.

As shown in FIG. 3, the placing head 6 has a pressing device 13 configured to press the fiber bundles 2 onto the placement die 5, a delivery mechanisms 12 configured to deliver the fiber bundles 2 toward the pressing device 13 and including a plurality of conveying mechanisms 12*a* each provided on each path of the fiber bundles 2, and a cutting device 14 configured to cut the fiber bundles 2 between the pressing device 13 and the delivery mechanism 12. In addition to the constitutional elements, the placing head 6 has guide rollers 18 provided on an upstream side of the paths of the fiber bundles 2 to each conveying mechanism 12*a* of the delivery mechanism 12 and configured to guide the fiber bundles 2 toward the delivery mechanism 12 (conveying mechanisms 12*a*). In addition to the guide rollers 18, the placing head 6 has conveying rollers 19 provided on the upstream side of the guide rollers 18 and configured to guide the fiber bundles 2 toward the guide rollers 18, and S-shaped guides 20 each provided on the upstream side of the conveying rollers 19 and configured to guide the fiber bundle 2 toward the conveying roller 19 by a pair of rollers 20*a* and 20*a*.

As for the constitutional members, the guide roller 18 is a hollow cylindrical member having a collar part. The guide roller 18 is provided on each of the paths so as to individually guide each fiber bundle 2. Specifically, the placing head 6 has the sixteen guide rollers 18. Each guide roller 18 is provided in the placing head 6 in such a form that an axis line direction thereof coincides with a width direction of the placing head 6. Note that, the width direction of the placing head 6 is a direction orthogonal to a front and rear direction of the placing head 6 (a direction that coincides with a direction in which the fiber bundles 2 are placed onto the placement die 5 by the placement), when the placing head 6 is seen in the vertical direction.

As described above, in the present embodiment, in order to allot the sixteen fiber bundles 2 guided to the placing head 6 into two groups, the sixteen guide rollers 18 are provided such that the fiber bundled are allotted to two positions different in the front and rear direction. Note that, the allotting is performed to divide the sixteen guide rollers 18 in eights. Each fiber bundle 2 is guided by the corresponding guide roller 18, so that, in the placing head 6, the sixteen fiber bundles 2 are allotted to two groups. In this way, the sixteen fiber bundles 2 are guided by the guide rollers 18 in the positions that are different for each group in the front and rear direction, Note that, each group of the fiber bundles 2 is composed of the eight fiber bundles 2 because the sixteen guide rollers 18 are allotted in eights in the two positions different in the front and rear direction. Therefore, the paths by the sixteen fiber bundles 2 become eight paths in each of the two positions different in the front and rear direction.

As described above, the S-shaped guide 20 is configured to guide the fiber bundle 2 by the pair of rollers 20*a* and 20*a*. Note that, each roller 20*a* is a hollow cylindrical member having a collar part. Similar to the guide roller 18, the S-shaped. guides 20 are each provided on each of the paths and are. guided by sixteen. The sixteen S-shaped guides 20 are provided at an upper part of the placing head 6 so as to guide the fiber bundles 2 from the guide mechanism 10 into the placing head 6. Note that, in the present embodiment, the sixteen fiber bundles 2 are individually guided by the tow guides 10*a* that are supported in fours by each of the four support shafts 10*d* of the guide mechanism 10, and the fiber bundles 2 are introduced in four groups every support shaft 10*d* (every four fiber bundles) into the placing head 6. Therefore, at the upper part of the placing head 6, the sixteen S-shaped guides 20 are provided in fours in the front and rear direction and are aligned in four rows.

The conveying rollers 19 are each a hollow cylindrical member having a collar part, and are provided by sixteen in a form corresponding to each of the S-shaped guides 20 between the S-shaped guides 20 and the guide rollers 18 in the vertical direction. The fiber bundle 2 guided from each S-shaped guide 20 is guided toward the corresponding guide roller 18 by the corresponding conveying roller 19.

In this way, in the placing head 6 of the present embodiment, each fiber bundle 2 from the guide mechanism 10 is guided toward the delivery mechanism 12 (conveying mechanism 12*a*) via the S-shaped guide 20, the conveying roller 19 and the guide roller 18 in corresponding order. Specifically, a mechanism 22 configured to guide the fiber bundle 2 toward the conveying mechanism 12*a* by the guide roller 18, the conveying roller 19 and the S-shaped guide 20 is provided on each path on the upstream side of the delivery mechanism 12 conveying mechanism 12*a*). Therefore, in the present embodiment, the mechanism 22 corresponds to the guidance mechanism.

The delivery mechanism 12 also includes a conveying mechanism 12*a* provided on each path of the fiber bundle 2, and a drive motor 12*b* provided for each conveying mechanism 12*a* and configured to rotationally drive the conveying mechanism 12*a*. In the present embodiment, each conveying mechanism 12*a* is constituted by a pair of rollers 12*c* and 12*d* provided to nip the fiber bundle 2. Each conveying mechanism 12*a* is configured such that as one (the roller 12*c*, in the shown example) of the pair of rollers 12*c* and 12*d* is rotationally driven by the drive motor 12*b*, the other is accordingly driven, thereby conveying the fiber bundle 2 toward the pressing device 13.

The pressing device 13 has a pressing part 13*a* configured to press the fiber bundle 2 onto the placement die 5 and a pressing mechanism (not shown) configured to generate a pressing force toward the placement die 5 for the pressing part 13*a*. Note that, in the present embodiment, the pressing part 13*a* is a so-called compaction roller that is a roller-shaped member provided to be rotatable, as a member common to each fiber bundle 2. Therefore, in the placing head 6, the path of each fiber bundle 2 extends from the corresponding guide roller 18 of the guide rollers 18 allotted to the two positions different in the front and rear direction to the pressing part 13*a* common to each fiber bundle 2.

The cutting device 14 includes a cutting blade 14*a* provided on each path of the fiber bundles 2, a fixed member 14*b* provided to locate the path between the fixed member 14*b* and the cutting blade 14*a*, and a drive mechanism 14*c* provided for each cutting blade 14*a* and configured to cause the cutting blade 14*a* to perform a cutting operation of cutting the fiber bundle 2. Note that, the cutting blade 14*a* is provided such that an extension direction of a blade edge thereof is parallel to the width direction of the placing head 6 and substantially orthogonal to a traveling direction of the fiber bundle 2. In the present embodiment, the fixed member 14*b* is a so-called anvil roller that is a roller-shaped member provided to be rotatable, and is provided for each cutting blade 14*a*. The cutting device 14 is configured to cut the fiber bundle 2 in cooperation with the cutting blade 14a and the fixed member 14b by the cutting operation of the cutting blade 14a by the drive mechanism 14c.

The constitutional elements of the placing head 6 such as the guidance mechanism 22 and the delivery mechanism 12 are each supported by a frame 30 of the placing head 6.

In the automated fiber bundle placement apparatus 1 configured as described above, in the present invention, the frame 30 of the placing head 6 is constituted by a main frame part provided with the delivery mechanism 12 (conveying mechanisms 12a) and attached to the multi-jointed robot 7 and a sub-frame part provided with the guidance mechanisms 22 and detachably attached to the main frame part. Further, it is assumed that the automated fiber bundle placement apparatus 1 of the present embodiment includes a holding mechanism provided to hold the sub-frame part between the guide mechanism 10 and the placing head 6 in the vertical direction. It is assumed that the holding mechanism of the present embodiment is constituted by a holding unit configured to hold the sub-frame part and a support unit configured to support the holding unit with respect to the multi-jointed robot 7, and the holding unit is rotatably attached to the support unit. In the below, an embodiment (present embodiment) of the automated fiber bundle placement apparatus 1 is described in detail with reference to FIGS. 4 to 8.

The main frame part 31 is mainly constituted by a pair of plate-shaped sidewalls 32 and 32 provided to face each other, and a beam member 33 connecting the pair of sidewalls 32 and 32. The delivery mechanism 12, the cutting device 14 and the pressing device 13 are provided to the main frame part 31 in a form of being supported by the pair of sidewalk 32 and 32. Note that, as described above, the constitutional elements are provided to deliver the fiber bundles 2 from above the placing head 6 (from the guide mechanism 10) toward the pressing device 13 by the delivery mechanism 12, and to cut the fiber bundles 2 between the delivery mechanism 12 and the pressing device 13 by the cutting device 14. Therefore, the arrangement of the constitutional elements in the main frame part 31 on the automated fiber bundle placement apparatus 1 is such that the delivery mechanism 12, the cutting device 14 and the pressing device 13 are arranged side by side in corresponding order from the upper toward the lower.

The beam member 33 that constitutes a part of the main frame part 31 is formed as a prismatic member. The beam member 33 is attached to attaching parts 32a of each sidewall 32, so that the pair of sidewalls 32 and 32 is connected and the main frame part 31 is thus formed in such a way.

Note that, in the present embodiment, the attaching part 32a of each sidewall 32 is formed in such a form that a part of a side edge of the sidewall 32 becoming an upper end edge on the automated fiber bundle placement apparatus 1 is made to further protrude than the other parts. In the meantime, the attaching part 32a is formed to be located closer to one end than a center on the side edge of the sidewall 32 becoming the upper end edge. The attaching part 32 is also formed to have a rectangular shape, as seen in a plate thickness direction of the sidewall 32, taking into consideration a sectional shape of the beam member 33. Note that, a part on the other end side of the attaching part 32a (an opposite side to the one end side on which the attaching part 32a is located) with respect to the side edge of each sidewall 32 becoming the upper end edge is referred to as an upper edge portion 32b.

In the main frame part 31, the delivery mechanism 12, the cutting device 14 and the pressing device 13 are provided in a form of being supported by the pair of sidewalls 32 and 32, as described above.

Specifically, the delivery mechanism 12 has a support shaft 12e for supporting the one roller 12c of each conveying mechanism 12a and a support shaft 12f for supporting the other roller 12d. In the delivery mechanism 12, both the rollers 12c and 12d of the plurality of conveying mechanisms 12a aligned in the width direction are supported by the common support shafts 12e and 12f. Specifically, both the support shafts 12e and 12f are provided as shafts common to the plurality of conveying mechanisms 12a aligned in the width direction. Therefore, both the support shafts 12e and 12f are provided in a form of being bridged between the pair of sidewalls 32 and 32 of the main frame part 31. In other words, the pair of sidewalls 32 and 32 are also connected by the support shafts 12e and 12f.

In the present embodiment, as described above, the paths of the sixteen fiber bundles 2 are allotted into groups of the eight paths in the two positions different in the front and rear direction. Therefore, the conveying mechanisms 12a (the pair of rollers 12c and 12d) each provided on each path are also provided in such a form that the eight conveying mechanisms for each group of the paths of the fiber bundles 2 are aligned side by side in the width direction in each of the two positions different in the front and rear direction. Therefore, the support shafts 12e and 12f are each provided by one in each of the positions in the front and rear direction, in which each conveying mechanism 12a is provided. Additionally describing, in each of the two positions in the front and rear direction, each conveying mechanism 12a is provided such that the other roller 12d is located on an inner side of the placing head 6 with respect to the one roller 12c in the front and rear direction.

Further, the drive motor 12b provided for each of the conveying mechanisms 12a is provided on the main frame part 31 in a form of being attached to an outer surface of the sidewall 32. More specifically, the sixteen drive motors 12b are divided in eights according to the arrangement of the corresponding conveying mechanisms 12a in the width direction, and are provided on the main frame part 31 in such a form that the eight drive motors 12b are attached to one of the pair of sidewalls 32 and 32 and the eight remaining drive motors 12b are attached to the other sidewall 32. Each drive motor 12b is connected to the corresponding conveying mechanism 12a (one roller 12c) via a transmission mechanism (not shown) consisting of a gear train and the like.

As for the cutting device 14, the drive mechanism 14c to which the cutting blade 14a is attached and the fixed member (anvil roller) 14b are provided on each of the paths, similar to the conveying mechanism 12a. Therefore, the eight drive mechanisms 14c and anvil rollers 14b are arranged side by side in the width direction in each of the two positions different in the front and rear direction.

Further, the eight drive mechanisms 14c provided in each of the two positions in the front and rear direction are connected to each other in a unit form in the arranging direction. The unitized eight drive mechanisms 14c (drive mechanism unit) are fixed to each of the pair of sidewalls 32 and 32 by brackets 14d and 14d. In other words, the drive mechanism unit is bridged between the pair of sidewalls 32 and 32 via the brackets 14d and 14d. Therefore, the pair of sidewalk 32 and 32 is also connected by the drive mechanism units and both the brackets 14d and 14d.

The eight anvil rollers 14b provided in each of the two positions in the front and rear direction are supported by the common support shaft 14*e*, similar to each of the rollers 12*c* and 12*d* of the delivery mechanism 12. Therefore, similar to each of the support shafts 12*e* and 12*f* of the delivery mechanism 12, the support shaft 14*e* is each provided in each position in the front and rear direction in which each anvil roller 14*b* is provided. The support shaft 14*e* is provided in a form of being bridged between the pair of sidewalls 32 and 32. In other words, the pair of sidewalls 32 and 32 is also connected by the support shafts 14*e*. Additionally describing, in each of the two positions in the front and rear direction, each anvil roller 14*b* is provided to be located on an inner side of the placing head 6 with respect to the drive mechanism 14*c* to which the corresponding cutting blade 14*a* is attached, in the front and rear direction.

As for the pressing device 13, the pressing mechanism has a support shaft 13*b* configured to support the pressing part (compaction roller) 13*a* and a pair of support plates 13*c* and 13*c* configured to support the support shaft 13*b*. The pressing mechanism is configured such that both the support plates 13*c* and 13*c* are supported by a drive device (not shown) such as an air cylinder. The pressing mechanism is also supported by a support member (not shown) bridged between the pair of sidewalls 32 and 32.

The pair of sidewalk 32 and 32 of the main frame part 31 is connected by each member (for example, the support shaft 12*e* configured to support the one roller 12*c*) bridged between both the sidewalls 32 and 32, in addition to the beam member 33, as described above. Therefore, the main frame part 31 is configured such that the pair of sidewalls 32 and 32 is connected by the beam member 33 and each member.

The main frame part 31 configured as described above is attached to the rotary part 11*a* of the rotation mechanism 11 attached to the arm 7*a* of the multi-jointed robot 7. Specifically, a plate-shaped base plate 34 is attached to the rotary part 11*a* of the rotation mechanism 11. The main frame part 31 is attached to the base plate 34 at the beam member 33, and hence, is attached to the multi-jointed robot 7. In this case, the attachment of the main frame part 31 to the base plate 34 is performed in such a form that, in the state where the main frame part 31 is attached to the multi jointed robot 7 (base plate 34), the upper edge portion 32*b* of the sidewall 32 is located on an outer side of the base plate 34, as seen in the vertical direction.

In this way, in the present embodiment, the placing head 6 (main frame part 31) is attached to the multi-jointed robot 7 via the rotation mechanism 11. In the automated fiber bundle placement apparatus of the preamble of the present invention, the rotation mechanism is not necessarily required, and the placing head (main frame part) may also be attached to the multi-jointed robot without the rotation mechanism.

The sub-frame part 35 is mainly constituted by a plate-shaped base member 36 and a pair of plate-shaped side plates 37 and 37 attached to the base member 36. Note that, the base member 36 and each side plate 37 each have a rectangular shape, as seen in a plate thickness direction. Each side plate 37 is formed such that a dimension in a short side direction of an end face thereof is smaller than a dimension of the upper edge portion 32*b* of the main frame part 31.

Each side plate 37 is attached to both side surfaces of the base member 36 (both side surfaces in a long side direction of the end face thereof) in such a form that an end face of each side plate is in contact with the side surface of the base member. In the attached state, each side plate 37 is attached to the base member 36 at a part of one end side in the long side direction of the end face thereof. The pair of side plates 37 and 37 is attached to the base member 36, as described above, so that the side plates are provided to the sub-frame part 35 in a form of facing each other.

The sub-frame part 35 is provided with the guide roller 18, the conveying roller 19, and the S-shaped guide 20, which constitute the guidance mechanism 22. As described above, the guidance mechanism 22 is provided to guide the fiber bundle 2 from the guide mechanism 10 toward the delivery mechanism 12, on the upstream side of the delivery mechanism 12. Therefore, as described above, in the frame 30 constituted by the main frame part 31 and the sub-frame part 35, the sub-frame part 35 is attached to the main frame part 31 so that the sub-frame part 35 (guidance mechanism 22) is located above the main frame part 31 (delivery mechanism 12) on the automated fiber bundle placement apparatus 1.

In the frame 30, the sub-frame part 35 is attached to the main frame part 31 at a part of the other end side in the long side direction of each side plate 37. In this way, on the automated fiber bundle placement apparatus 1, the base member 36 of the sub-frame part 35 is located on an upper end-side of the frame 30 (placing head 6).

The S-shaped guide 20 provided on the most upstream side of the guidance mechanism 22 is provided in a form of being supported by the base member 36 of the sub-frame part 35 in the placing head 6 (frame 30). More specifically, the sixteen S-shaped guides 20 are attached in a form of being aligned as described above on the surface of the base member 36 becoming the upper end surface of the frame 30 on the automated fiber bundle placement apparatus 1. Note that, as for the attachment, each S-shaped guide 20 is constituted to have not only the pair of rollers 20*a* and 20*a* but also a support body 20*b* for supporting both the rollers 20*a* and 20*a*. Each S-shaped guide 20 is attached to the base member 36 at the support body 20*b*. The base member 36 is also formed with an introduction hole 36*a* for introducing the fiber bundle 2 into the sub-frame part 35 (placing head 6) in a form corresponding to each S-shaped guide 20.

Further, as described above, the guidance mechanism 22 is provided with the conveying roller 19 between the S-shaped guide 20 and the guide roller 18. Specifically, the S-shaped guide 20, the conveying roller 19 and the guide roller 18 are provided in corresponding order on the path of the fiber bundle 2 extending from the S-shaped guide 20 to the delivery mechanism 12 in the frame 30. In the sub-frame part 35, the conveying roller 19 is provided in a form of being attached to the base member 36, and the guide roller 18 is provided in a form of being supported by the pair of side plates 37 and 37.

Specifically, each conveying roller 19 is attached to an end face of the base member 36 opposite to the end face to which the S-shaped guide 20 is attached. Specifically, each conveying roller 19 is supported by the base member 36 in such a form that the base member 36 is located between the conveying roller 19 and the S-shaped guide 20, and is provided in a form of hanging from the base member 36 on the automated fiber bundle placement apparatus 1. The attachment of each conveying roller 19 to the base member 36 is performed via a hanging member 38 provided for each conveying roller 19 and configured to rotatably support the conveying roller 19.

Note that, as described above, each conveying roller 19 is provided in the form corresponding to each S-shaped guide 20, and the base member 36 is formed with the introduction hole 36*a* in the form corresponding to each S-shaped guide 20. Each conveying roller 19 is provided as described above, in a position corresponding to each introduction hole 36*a*, more specifically, in a position in which the fiber bundle 2 to pass through the corresponding introduction hole 36*a* is guided. Therefore, the sixteen conveying rollers 19 are provided in fours in the front and rear direction and are aligned in four rows, similar to the S-shaped guides 20.

As described above, the guide rollers 18 are provided in eights in each of the two positions different in the front and rear direction. Therefore, as described above, the sixteen fiber bundles 2 divided into the four groups via the guide mechanism 10 and the S-shaped guides 20 and introduced into the placing head 6 are guided in eights toward each of the positions in which the guide rollers 18 are provided, after passing through the conveying rollers 19 provided as described above. More specifically, the fiber bundles 2 having passed through the conveying rollers 19 of two rows on a front side (a side on Which the placing head 6 is moved with respect to a direction in which the fiber bundles 2 are placed on the placement die 5 by the placement) are guided toward the guide rollers 18 arranged on the front side of the two positions. On the other hand, the fiber bundles 2 having passed through the conveying rollers 19 of two rows on a rear side are guided toward the guide rollers 18 arranged on the rear side of the two positions. Note that, in the shown example, the position of the front side (rear side) on which the guide rollers 18 are arranged is a position in which the guide rollers 18 are located between the conveying rollers 19 of two rows on the front side (rear side) with respect to the front and rear direction.

The eight guide rollers 18 arranged in each of the two positions are supported by a common support shaft 39. Specifically, in each of the two positions, the support shaft 39 is provided in a form of being bridged between the pair of side plates 37 and 37 of the sub-frame part 35, and the eight guide rollers 18 are each supported by each support shaft 39. Note that, each support shaft 39 is provided in the form of being bridged between the pair of side plates 37 and 37. Therefore, the pair of side plates 37 and 37 of the sub-frame part 35 is also connected by the two support shafts 39 and 39.

In the frame 30 including the main frame part 31 and the sub-frame part 35 configured as described above, the frame 30 is configured such that the sub-frame part 35 is detachably connected to the main frame part 31, as described above. In the configuration, more specifically, the sub-frame part 35 is attached to the main frame part 31 at each side plate 37, as described above. Therefore, the sub-frame part 35 is provided with an attaching part 40 in a form of being attached to each side plate 37, as a part to be attached to the main frame part 31. On the other hand, the main frame part 31 is provided with an attached part 42 in a form of being attached to each sidewall 32, as a part to which the sub-frame part 35 (attaching part 40) is attached. Each attaching part 40 of the sub-frame part 35 is attached to a corresponding attached part of both the attached parts 42 and 42 of the main frame part 31, so that the main frame part 31 and the sub-frame part 35 are integrally attached.

In the present embodiment, each attached part 42 of the main frame part 31 is a member obtained by bending a plate into an L-shape. In the shown example, the attached part 42 is configured such that a width dimension is substantially matched with a dimension in the short side direction of the side plate 37 of the sub-frame part 35. Each attached part 42 is attached to an outer surface of the corresponding sidewall 32 at a part on a further one end side than the bent part. The attachment is performed in such a form that the width direction of the attached part 42 is parallel to the upper edge portion 32*b* within a range of the upper edge portion 32*b* of the sidewall 32. Also, the attachment is performed in such a form that a part of the attached part 42 on a further other end side than the bent part is located closer to the attaching part 32*a* than the upper edge portion 32*b* of the sidewall 32.

Note that, in the present embodiment, each attaching part 40 of the sub-frame part 35 is constituted by a fiat plate-shaped member. Each attaching part 40 is constituted by a member whose both end faces in a plate thickness direction each have a rectangular shape and a dimension of each of both end faces in a long side direction is sufficiently greater than a dimension in a short side direction. Note that, in the shown example, the dimension of the attaching part 40 in the long side direction is substantially matched with the dimension of the side plate 37 in the short side direction (≈the width dimension of the attached part 42). Further, both the end faces of the attaching part 40 are each formed to have substantially the same size as an outer surface of the part of the attached part 42 on the further other end side than the bent part.

Each attaching part 40 is attached to an outer surface of the corresponding side plate 37 in such a form that one of both side surfaces in the short side direction is in contact with the outer surface. The attachment is performed in such a form that one of both the end faces of the attaching part 40 is flush with a peripheral surface on the other end side of a peripheral surface (a surface parallel to the plate thickness direction) of the side plate 37, on the other end side of the side plate 37.

Further, as described above, each attaching part 40 is attached to the corresponding attached part 42, so that the sub-frame part 35 is attached to the main frame part 31. Note that, the attachment is performed using screw members 41. Therefore, the attaching part 40 is formed with through-holes 40*a* penetrating in the plate thickness direction at two places of the end face spaced in the long side direction, Further, the part of the attached part 42 on the further other end side than the bent part is formed with female screw holes 42*a* penetrating in the plate thickness direction in two positions that coincide with the two through-holes 40*a* and 40*a* of the attaching part 40 in a state where the part on the other end side is in contact with the attaching part 40 in positional alignment.

The screw members 41 each inserted in each through-hole 40*a* of each attaching part 40 are screwed into the female screw holes 42*a* of the attached part 42, so that the sub-frame part 35 is attached to the main frame part 31, as described above. Therefore, the frame 30 constituted by the main frame part 31 and the sub-frame part 35 attached in this way is configured such that the sub-frame part 35 can be attached and detached with respect to the main frame part 31 by attaching and detaching the screw members 41.

The sub-frame part 35 of the frame 30 of the present embodiment is provided with a handle unit 43 for an operator to grip the sub-frame part 35 with a hand. As for the handle unit 43, more specifically, the handle unit 43 is constituted by a grip part 43*a* formed by bending a rod member (round rod) into a U-shape, as a grip part that is gripped by the operator, and flat plate-shaped fixed parts 43*b* attached to the grip part 43*a* at both end portions of the grip part 43*a*. In the sub-frame part 35, the handle unit 43 constituted by the grip part 43*a* and the pair of fixed parts 43*b* and 43*b* is attached to each side plate 37.

Note that, as for each handle unit 43, the grip part 43*a* is formed into the U-shape in such a form that a portion (intermediate portion) between both bend portions is longer than portions on an end portion-side. The fixed part 43*b* has a rectangular shape, as seen in a plate thickness direction thereof and is formed such that a dimension in a short side direction of an end face thereof is substantially matched with a plate thickness dimension of the side plate 37 (a dimension in the plate thickness direction of the peripheral surface of the side plate 37). Each fixed part 43b is fixed to the grip part 43a in a direction in which a long side direction of an end face thereof is matched with an axis line direction of the intermediate portion of the grip part 43a. Further, each fixed part 43b is formed with a through-hole penetrating in a plate thickness direction, in which a screw member 44 for attaching the handle unit 43 to the side plate 37 is inserted.

Each handle unit 43 is attached to the corresponding side plate 37 on one of peripheral surfaces of both sides in the short side direction of the side plate 37. The one peripheral surface of each side plate 37 to which the handle unit 43 is attached is a peripheral surface, which is on an opposite side to a peripheral surface that faces toward the attaching part 32a of the sidewall 32 of the main frame part 31 in a state where the sub-frame part 35 is attached to the main frame part 31, of the peripheral surfaces on both the sides. The attachment of each handle unit 43 to the side plate 37 is performed in such a form that the screw member 44 inserted in the through-hole of each fixed part 43b of the handle unit 43 is screwed into the side plate 37.

As described above, in the present embodiment, the sub-frame part 35 has the handle unit 43. However, in the present invention, since the sub-frame part is not limited to the configuration where the handle unit for the operator to grip is provided, the handle unit as described above may not be provided.

As described above, the automated fiber bundle placement apparatus 1 of the present embodiment includes the holding mechanism 50 provided to hold the sub-frame part 35 between the guide mechanism 10 and the placing head 6 in the vertical direction. Note that, the holding mechanism 50 is constituted by a holding unit 51 configured to hold the sub-frame part 35 and a support unit 52 configured to support the holding unit 51 with respect to the multi-jointed robot 7. In the holding mechanism 50 of the present embodiment, the holding unit 51 is provided to be rotatable with respect to the support unit 52. The configuration of the holding mechanism 50 is specifically described, as follows.

The support unit 52 is constituted by a prismatic first support bracket 53 attached to the multi-jointed robot 7 and a plate-shaped second support bracket 54 attached to the first support bracket 53. The second support bracket 54 is attached to one of four peripheral surfaces of the first support bracket 53 parallel to a longitudinal direction. In other words, one of the peripheral surfaces of the first support bracket 53 is formed as an attaching surface for attaching the second support bracket 54.

The second support bracket 54 has a rectangular shape, as seen in a plate thickness direction thereof, and is attached to the attaching surface of the first support bracket 53 at a part on one end side of an end face thereof in a long side direction. The attachment is performed in such a form that the long side direction of the second support bracket 54 is substantially orthogonal to the longitudinal direction of the first support bracket 53 at a central part in the longitudinal direction of the attaching surface of the first support bracket 53. Further, the support unit 52 is attached at the first support bracket 53 to the support mechanism 10e of the guide mechanism 10 attached to the multi-jointed robot 7.

For this reason, the support mechanism 10e has a pair of prismatic support bars 10f and 10f, which are attached to the arm 7a of the multi-jointed robot 7. Note that, the pair of support bars 10f and 10f is attached at one end portions thereof to both side surfaces of a rear end portion (a portion opposite to a tip end portion to which the placing head 6 is attached) of the arm 7a of the multi jointed robot 7. The attachment is performed in such a form that a longitudinal direction of each support bar 10f has an angle relative to an extension direction of the arm 7a and the other end portions of both the support bars 10f and 10f are located between the arm 7a and the support member 10b of the guide mechanism 10 provided above the arm 7a as described above.

Further, the support unit 52 is attached at both end portions of the first support bracket 53 to the other end portions of the pair of support bars 10f and 10f. The attachment is performed in such a form that the second support bracket 54 of the support unit 52 extends toward an opposite side to the one end portion (the rear end portion of the arm 7a)-side of the support bar 10f with respect to the first support bracket 53.

The holding unit 51 includes a hooking part 56 configured to hook and support the sub-frame part 35 and an attaching bracket 55 for attaching the hooking part 56 to the support unit 52. The holding unit 51 also has a receiving part 57 configured to receive and support the sub-frame part 35 hooked to the hooking part 56.

As for the constitutional elements, the hooking part 56 is formed by a plate member whose end face is rectangular and a dimension in a long side direction is sufficiently greater than a dimension in a short side direction. The hooking part 56 is formed as a U-shaped member whose both end portions are bent to be orthogonal to a portion (intermediate portion) between both the end portions. Note that, a dimension of the intermediate portion of the hooking part 56 in the long side direction (an interval between both the end portions) is greater than an interval between the outer surfaces of both the side plates 37 and 37 of the sub-frame part 35 in the width direction (the plate thickness direction of the side plate 37). The attaching bracket 55 is formed by a plate member whose end face is rectangular and a dimension in a long side direction is sufficiently greater than a dimension in a short side direction, like the hooking part 56. Further, the attaching bracket 55 is formed as an L-shaped member whose one end portion in a longitudinal direction (a tip end-side end portion) is bent to be orthogonal to other main portion.

Further, the hooking part 56 is attached at an outer surface of a central portion in the long side direction of the intermediate portion to an outer surface of the tip end-side end portion of the attaching bracket 55. The attachment is performed in such a form that the long side direction of the intermediate portion of the hooking part 56 is parallel to an end face of the main portion of the attaching bracket 55. In the attached state, both the end portions of the hooking part 56 extend in an opposite direction to the main portion with respect to the tip end-side end portion of the attaching bracket 55.

The holding unit 51 configured as described above is supported at the main portion of the attaching bracket 55 by the support unit 52. As for the support, in the present embodiment, as described above, the holding unit 51 is provided to be rotatable with respect to the support unit 52, and the support is performed using a configuration of implementing the rotation.

As for the configuration, specifically, the holding mechanism 50 of the present embodiment is provided with a rotary shaft 60 for rotatably supporting the holding unit 51 with respect to the support unit 52. Therefore, the second support bracket 54 of the support unit 52 is formed with a through-hole 54a penetrating in the plate thickness direction, through Which the rotary shaft 60 can be inserted. The through-hole 54a is formed to be located at the center of the second support bracket 54 in the short side direction at a part on the other end side of the second support bracket 54 in the long side direction (an opposite side to the one end side that is attached to the first support bracket 53).

Further, the rotary shaft 60 is rotatably attached to the second support bracket 54 via a bearing 61 fitted in the through-hole 54a. In the attached state, the rotary shaft 60 is provided such that both end portions protrude from the second support bracket 54.

The holding unit 51 is attached at the main portion of the attaching bracket 55 to one end portion, which is an end portion on an opposite side to the first support bracket 53-side, of both the end portions, which protrude from the second support bracket 54, of the rotary shaft 60 provided to the second support bracket 54. Note that, in the present embodiment, the attachment is performed via a split clamping member 62 attached to the main portion of the attaching bracket 55 of the holding unit 51.

The split clamping member 62 is constituted by a cylindrical insertion part 63 having a through-hole 63a in which the rotary shaft 60 is inserted and an attaching part 64 that is attached to the main portion of the attaching bracket 55. The insertion part 63 has a split clamping structure including a screw slotted portion 63b configured to communicate with the through-hole 63a. The attaching part 64 is formed by two parts protruding outward in a radial direction of the insertion part 63 at one end portion, in an axis line direction, of the insertion part 63. Note that, the two parts forming the attaching part 64 are formed in positions between which an axis center of the insertion part 63 is located as seen in the axis line direction of the insertion part 63, at portions of the one end portion of the insertion part 63 except the screw slotted portion 63b. Further, each portion of the attaching part 64 is formed with a through-hole (not shown) penetrating in the axis line direction of the insertion part 63, in which a screw member 65 for attaching the split clamping member 62 to the attaching bracket 55 is inserted.

The split clamping member 62 configured as described above is attached to the outer surface of the main portion of the attaching bracket 55 by screwing the screw members 65 inserted in each of the through-holes of the attaching part 64 into the main portion. The attachment is performed at an end portion on an opposite side to a side of the tip end-side end portion in the long side direction of the main portion of the attaching bracket 55 such that the split clamping member 62 is located at the center of the attaching bracket 55 in the short side direction.

Further, the holding unit 51 is attached to the rotary shaft 60 so as not to be relatively rotatable by performing split clamping fixing by the split clamping structure of the insertion part 63 in a state where the one end portion of the rotary shaft 60 is inserted in the through-hole 63a of the insertion part 63 of the split clamping member 62. In this way, the holding unit 51 is supported to be rotatable by the support unit 52. Specifically, the holding unit 51 is provided so that a direction thereof (the long side direction of the main portion of the attaching bracket 55) can be changed with respect to the long side direction of the second support bracket 54 of the support unit 52, as seen in the axis line direction of the rotary shaft 60.

Note that, the holding mechanism 50 of the present embodiment is provided with a clamp device 70 for setting the rotary shaft 60 provided so as to be rotatable as described above to a non-rotatable state (damped state) so that a direction of the holding unit 51 can be held in a desired direction. The clamp device 70 is mainly constituted by a main body part 71 attached to the second support bracket 54 of the support unit 52 in such a form that the other end portion (an end portion on the first support bracket 53-side) of both the end portions of the rotary shaft 60 is inserted. The clamp device 70 also has a lever 72 for switching the clamped state and a state (unclamped state) where the rotary shaft 60 can rotate, and the lever 72 is provided so as to be rotatable with respect to the main body part 71. Although details are omitted, the clamp device 70 is configured such that, when the lever 72 is rotated, a clamp member (not shown) provided in the main body part 71 is accordingly switched between a state of being pressed against the rotary shaft 60 and a state of being spaced from the rotary shaft 60. By this configuration, the clamped state and the unclamped state can be switched by an operation on the lever 72.

The hooking part 56 of the holding unit 51 is a constitutional element for hooking supporting the sub-frame part 35 as described above. Therefore, in the present embodiment, the hooking part 56 has a notch 56a for hooking the sub-frame part 35 at each end portion bent with respect to the intermediate portion. Note that, the sub-frame part 35 has an engaging portion 35a to be engaged with the notch 56a so as to be in the state of being hooked on the hooking part 56.

As for the notch 56a and the engaging portion 35a, more specifically, the notch 56a is formed at each end portion of the hooking part 56 in such a shape that a side edge on an upper edge (a side edge facing toward the same direction as the outer surface of the main portion of the attaching bracket 55 in a state where the hooking part 56 is attached to the attaching bracket 55) of side edges of the end portion is notched into a rectangular shape. Therefore, on the automated fiber bundle placement apparatus 1, each notch 56a is opened upward in the state where the holding unit 51 is supported by the support unit 52 as described above.

In the meantime, in the present embodiment, the engaging portion 35a is a screw member, and is provided for each side plate 37 of the sub-frame part 35. Each engaging portion 35a is attached to the corresponding side plate 37 in such a form that a tip end-side portion of a shaft portion is screwed from an outside of the side plate 37. In this way, each engaging portion 35a in the attached state is in a state where a portion of the shaft portion except the tip end-side portion protrudes from the outer surface of the side plate 37.

In the short side direction of the side plate 37, an attachment position of the engaging portion 35a to the side plate 37 is a position in which the sub-frame part 35 and the intermediate portion of the hooking part 56 are spaced from each other in the state where the sub-frame part 35 is hooked to the hooking part 56 of the holding unit 51. Also, in the long side direction of the side plate 37, the attachment position is a position in which the center of the side plate 37 in the long side direction is lower than the hooking part 56 in the state where the sub-frame part 35 is hooked to the hooking part 56. On the automated fiber bundle placement apparatus 1, the sub-frame part 35 is supported by the holding unit 51 (holding mechanism 50) in a hanging form in a state where the engaging portion 35a of the sub-frame part 35 is engaged with the notch 56a of the hooking part 56 of the holding unit 51.

Note that, since the sub-frame part 35 is supported by the holding unit 51 in such a hanging form, the sub-frame part 35 is in a swinging and moving state around the engaging portion 35a, as it is. Therefore, in the present embodiment, the holding unit 51 has the receiving part 57 configured to receive and support the sub-frame part 35 hooked to the engaging portion 35a.

In the present embodiment, the receiving part 57 is configured to support (receive) the sub-frame part 35 at two places spaced in the width direction of the sub-frame part 35. Therefore, the receiving part 57 is constituted by a pair of abutting parts 58 and 58 in contact with the sub-frame part 35 supported on the hooking part 56 of the holding unit 51 as described above and a pair of attaching bars 59 and 59 each provided for each of the abutting parts 58 so as to attach each of the abutting parts 58 to the hooking part 56.

Each attaching bar 59 is a prismatic member and is formed such that a dimension in a longitudinal direction thereof is substantially the same as an interval between the engaging portion 35a of the sub-frame part 35 and the attaching part 40. Both the attaching bars 59 and 59 are each attached at one end portion to an inner surface of the intermediate portion of the hooking part 56 so that one of four peripheral surfaces parallel to the longitudinal direction is an attaching surface.

Attachment positions of each of the attaching bars 59 to the hooking part 56 are positions in which both the attaching bars 59 and 59 and both the side plates 37 and 37 of the sub-frame part 35 face each other in the state where the sub-frame part 35 is hooked to the hooking part 56 as described above. Further, the attachment is performed in such a form that each attaching bar 59 extends in an opposite direction to the opening direction of the notch 56a with respect to the hooking part 56. Therefore, on the automated fiber bundle placement apparatus 1, each attaching bar 59 extends downward from the hooking part 56 of the holding unit 51 in the state where the holding unit 51 is supported by the support unit 52 as described above.

In the shown example, each abutting part 58 is a screw member, and is attached to the other end portion of the corresponding attaching bar 59 of the pair of attaching bars 59 and 59 attached to the hooking part 56, in such a form that a tip end-side portion of a shaft portion thereof is screwed. Further, the attachment is performed in such a form that the abutting part 58 protrudes from a peripheral surface on an opposite side to the attaching surface of the attaching bar 59. In the attached state, each abutting part 58 is in a state where a head portion thereof is located in substantially the same position as the notch 56a of the hooking part 56 in the protruding direction of the abutting part 58 from the attaching bar 59.

The receiving part 57 configured as described above is provided to the holding unit 51, so that the sub-frame part 35 hooked on the hooking part 56 of the holding unit 51 is received at the other end-side portions (the portions to which the attaching parts 40 are attached) in the long side direction of both the side plates 37 and 37 by the receiving part 57 (both the abutting parts 58 and 58). In this way, in the holding unit 51. the receiving part 57 functions to hold the sub-frame part 35 hooked on the hooking part 56 in a still state.

In the automated fiber bundle placement apparatus 1 described above, when performing maintenance on the conveying mechanism 12a of the placing head 6, a maintenance operation including the maintenance and an operation associated with the maintenance (for example, an operation of attaching and detaching the sub-frame part 35 of the frame 30 of the placing head 6) is performed by the operator, as follows.

First, in the frame 30 of the placing head 6, each screw member 41 screwed to each attached part 42 of the main frame part 31 is unfastened to set the sub-frame part 35 to a state where the sub-frame part 35 can be removed (moved) from the main frame part 31.

At the time of the removing, in a case where the direction of the holding unit 51 of the holding mechanism 50 and the direction of the placing head 6 are different from each other, an operation of matching the direction of the holding unit 51 with the direction of the placing head 6 is performed. Specifically, in the holding mechanism 50, the lever 72 of the clamp device 70 is operated to set the rotary shaft 60 to which the holding unit 51 is attached to a rotatable state, and the direction of the holding unit 51 is then matched with the direction of the placing head 6. Then, the lever 72 is again operated to set the rotary shaft 60 to a non-rotatable state, so that the direction of the holding unit 51 is fixed (held) in a state where the direction of the holding unit 51 is matched with the direction of the placing head 6.

Then, the sub-frame part 35 is moved toward the holding unit 51 of the holding mechanism 50. Note that, as for the moving of the sub-frame part 35, the holding mechanism 50 provided between the guide mechanism 10 and the placing head 6 in the vertical direction is located near the path of the fiber bundle 2 from the guide mechanism 10 to the placing head 6 at a moving destination. Further, the sub-frame part 35 is provided with the handle unit 43 for the operator to grip with a hand, as described above. Therefore, the operator can easily move the sub-frame part 35.

Subsequently, both the engaging portions 35a and 35a of the sub-frame part 35 are engaged with both the notches 56a and 56a of the hooking part 56 of the holding unit 51, thereby hooking the sub-frame part 35 on the hooking part 56. In this way, the sub-frame part 35 is supported (held) by the holding unit 51 in a form of being received by the receiving part 57 of the holding unit 51.

Note that, in the holding state, the direction of the holding unit 51 is matched with the direction of the placing head 6. In this way, in the holding state, each fiber bundle 2 is prevented from being inclined and twisted between the guidance mechanism 22 provided to the sub-frame part 35 and the conveying mechanism 12a provided to the main frame part 31, and accordingly, each fiber bundle 2 is prevented from being pressed against the collar part of each member of the guidance mechanism 22, such as the guide roller 18. As described above, the holding mechanism 50 is configured such that the holding unit 51 can be rotated (the direction thereof can be changed) with respect to the support unit 52. Therefore, even when the direction of the holding unit 51 and the direction of the placing head 6 are different from each other at the time of the removing, the direction of the holding unit 51 and the direction of the placing head 6 are matched, so that damage of the fiber bundle 2, which is caused when the fiber bundle 2 is pressed against the collar part, is prevented.

The sub-frame part 35 is moved from the main frame part 31 and held by the holding mechanism 50, as described above, so that the main frame part 31 is in a state where a space above the conveying mechanism 12a provided in the main frame part is opened to the outside. Then, an operation (the maintenance) on the conveying mechanism 12a in the main frame part 31 is performed. Note that, the maintenance is performed after the sub-frame part 35 is held by the holding mechanism 50, and during the maintenance, the automated fiber bundle placement apparatus 1 holds (supports) the sub-frame part 35. Therefore, since it is not necessary to ask for another's help so as to hold the sub-frame part 35, one operator can perform the maintenance operation including the moving of the sub-frame part 35 of the present invention.

After completing the maintenance, the sub-frame part 35 is separated from the holding unit 51 (hooking part 56), and is moved toward the main frame part 31. Then, each attaching part 40 of the sub-frame part 35 is matched with the corresponding attached part 42 of both the attached parts 42 and 42 of the main frame part 31, and the screw members 41 are each screwed to each attached part 42. In this way, the sub-frame part 35 is again attached to the main frame part 31.

As described above, according to the automated fiber bundle placement apparatus 1 of the present embodiment, when performing the maintenance operation including the maintenance on the conveying mechanisms 12a provided in the frame 30 (main frame part 31), the plurality of guidance mechanisms 22 (the guide rollers 18, the conveying rollers 19 and the S-shaped guides 20), which are provided above the conveying mechanisms 12a inside the frame 30 and interfere with the maintenance, can be moved from above the conveying mechanisms 12a simply by removing and moving the sub-frame part 35 from the main frame part 31, as described above. Specifically, the detaching and returning of all the guidance mechanisms 22 from and to the positions above the conveying mechanisms 12a, which are necessary when performing the maintenance, are achieved simply by attaching and detaching the sub-frame part 35 with respect to the main frame part 31. Therefore, according to the automated fiber bundle placement apparatus 1, it is possible to easily perform the maintenance operation.

Note that, the present invention is not limited to the above embodiment, and can also be implemented in aspects (modified embodiments) modified as described in (1) to (6).

(1) As for the configuration (attaching configuration) for attaching the sub-frame part to the main frame part, in the above embodiment, the attaching configuration includes the attached part 42 that is a member attached to the sidewall 32 separately from the sidewall 32 of the main frame part 31, the attaching part 40 that is a member attached to the side plate 37 separately from the side plate 37 of the sub-frame part 35, and the screw member 41 for fixing the attached state of both the members.

However, in the attaching configuration, the attached part on the main frame part 31-side is not limited to such a form that the separate member as described in the above embodiment is attached to the sidewall 32, and may be provided as a configuration part of the sidewall so that a part of the sidewall functions as the attached part. Similarly, the attaching part on the sub-frame part 35-side is not limited to such a form that the separate member as described in the above embodiment is attached to the side plate 37, and may be provided as a configuration part of the side plate so that a part of the side plate functions as the attaching part.

Further, as for the attaching configuration, in the above embodiment, the attaching part 40 on the sub-frame part 35-side is configured such that the dimension in the long side direction is substantially the same as the dimension in the short side direction of the side plate 37 of the sub-frame part 35. In this way, the attaching part 40 is provided to be within a presence range of the side plate 37 in the short side direction of the side plate 37 of the sub-frame part 35. The attached part 42 on the main frame part 31-side is configured such that the width dimension is substantially the same as the dimension in the long side direction of the attaching part 40 on the sub-frame part 35-side.

However, in the attaching configuration, the attaching part on the sub-frame part 35-side is not limited to such a form that it is within the presence range of the side plate 37, and may also be within a range smaller than the side plate in the short side direction of the side plate. In this case, the attaching part may be provided at one or more places within the presence range of the side plate in the short side direction of the side plate of the sub-frame part. In the case where the attaching part is provided in this way, the attached part on the main frame part 31-side may be provided like the above embodiment but is not limited thereto. For example, the attached part may be provided in any way as long as the attaching part on the sub-frame part 35-side can be attached thereto.

In the attaching configuration, as for the means (fixing means) for fixing the attached state between the attached part on the main frame part-side and the attaching part on the sub-frame part-side, in the above embodiment, the screw member 41 is used as the fixing means. However, the fixing means may also be a well-known means other than the screw member.

(2) As for the holding mechanism, in the above embodiment, the automated fiber bundle placement apparatus 1 includes the holding mechanism 50 provided to hold the sub-frame part 35. In the case where the automated fiber bundle placement apparatus includes the holding mechanism as a configuration for holding the sub-frame part, in the above embodiment, the holding mechanism 50 is configured such that the holding unit 51 can rotate (the direction can change) with respect to the support unit 52.

However, even when the automated fiber bundle placement apparatus includes the holding mechanism, the holding mechanism is not limited to the configuration where the holding unit can rotate with respect to the support unit, like the above embodiment, and may also be configured such that the holding unit cannot rotate (the direction is fixed). Note that, in this case, when the direction of the holding unit of the holding mechanism and the direction of the placing head are different from each other at the time of removing the sub-frame part during the maintenance operation, the direction of the placing head is preferably matched with the direction of the holding unit by rotationally driving the rotation mechanism 11 (rotary part 11a) to which the placing head is attached.

(3) As for the case where the automated fiber bundle placement apparatus includes the holding mechanism, in the above embodiment, in the holding mechanism 50 and the sub-frame part 35, as the configuration (holding configuration) for holding the sub-frame part 35 on the holding mechanism 50, the holding unit 51 of the holding mechanism 50 is provided with the hooking part 56 having the notch 56a formed as described above, and the sub-frame part 35 is provided with the engaging portion 35a that is a screen member attached to each side plate 37, as described above. In the holding configuration, the sub-frame part 35 is hooked on the holding mechanism 50 in such a form that the engaging portion 35a of the sub-frame part 35 is engaged with the notch 56a of the holding mechanism 50.

In this way, in the above embodiment, the holding configuration is configured such that the held portion of the sub-frame part 35 is received at the holding portion of the holding mechanism 50, and hence, the holding mechanism 50 supports a weight of the sub-frame part 35. Further, in the above embodiment, the held portion of the sub-frame part 35 is provided as a portion extending in the width direction, and the holding portion of the holding mechanism 50 is a notch portion formed in the plate-shaped part parallel to the side plate 37 of the sub-frame part 35 in the hooked state.

However, even when the holding configuration is configured to support the weight of the sub-frame part by the holding portion on the holding mechanism-side, like the above embodiment, the holding configuration is not limited to such configuration, and may also be configured such that the holding portion on the holding mechanism 50-side is proved as a portion extending in the width direction and the held portion on the sub-frame part 35-side is a notch portion formed in the side plate 37.

Specifically, in the holding mechanism configured as described in the above embodiment, the hooking part of the holding unit is configured such that the holding portion such as a screw member extends in the width direction (the plate thickness direction of both the end portions) with respect to both the end portions. Further, for the sub-frame part, a notch portion as the held portion formed to accommodate a part of the holding portion may be provided to each side plate.

Note that, the notch portion on the sub-frame part-side has a groove shape, and is formed on its peripheral surface in an opening form so as to accommodate the holding portion from a peripheral surface opposite to the peripheral surface to which the handle unit is attached. In addition, the notch portion has a shape including a portion extending toward the upper (the base member 36) in the long side direction of the side plate of the sub-frame part so as to engage with the accommodated holding portion. Further, the notch portion is preferably formed in a position in which the center of the side plate in the long side direction is lower than the holding portion in the state where the sub-frame part is hooked on the holding portion, specifically, in a position in which the sub-frame part is received by the receiving part 57 of the holding unit in the hooked state.

In the case where the holding portion on the holding mechanism-side is configured to support the weight of the sub-frame part, as described above, the holding. portion is not limited to the configuration where the held portion of the sub-frame part can he hooked, and may also be configured to hold the sub-frame part in a placed state.

Specifically, for example, in the configuration of the above embodiment, the abutting part 58 of the receiving part 57 of the holding unit 51 may be omitted, and a plate-shaped member as the holding portion for placing thereon the sub-frame part may be instead attached to the other end portion of each attaching bar 59. Note that, the plate-shaped holding portion is formed in a position and to have a size in the width direction capable of placing thereon the side plate and the attaching part 40 of the sub-frame part.

In this configuration, in the sub-frame part, the engaging portion 35a provided in the above embodiment is omitted, and the attaching part 40 and a part of the side plate to which the attaching part 40 is attached become the held portion. In addition, since the holding portion holds the sub-frame part in the placed state as described above, the holding portion is preferably provided with a configuration for preventing the sub-frame part from dropping (for example, a protruding portion to engage with the through-hole 40a of the attaching part 40 is provided). Further, in order to maintain the position in the width direction of the sub-frame part in the placed state, for example, an interval between both the end portions of the hooking part 56 is preferably set to be substantially the same as an interval between the outer surfaces of both the side plates of the sub-frame part in the width direction.

(4) As for the holding mechanism, in the above embodiment, the holding mechanism 50 is provided in the form of being attached to the support mechanism 10e of the guide mechanism 10 attached to the multi-jointed robot 7. Specifically, the holding mechanism 50 is attached to the multi-jointed robot 7. However, even when the holding mechanism is provided in the present invention, the part of the automated fiber bundle placement apparatus to which the holding mechanism is attached is not limited to the multi-jointed robot, like the above embodiment, and may also be the main frame part of the placing head.

In the present invention, the automated fiber bundle placement apparatus is not limited to the configuration including the holding mechanism. For example, the holding mechanism may not be provided. Note that, in this case, the sub-frame part removed from the main frame part may be held using a movable holding device (for example, a stand) separately provided from the automated fiber bundle placement apparatus, as a means for the holding. Alternatively, the holding device may not be provided, and the holding operation may be performed by an operator other than the operator who performs the maintenance on the conveying mechanism of the placing head.

(5) As for the guidance mechanism provided to the placing head (sub-frame part), in the above embodiment, the guidance mechanism 22 has the conveying roller 19 and the S-shaped guide 20, in addition to the guide roller 18. However, in the placing head of the automated fiber bundle placement apparatus of the preamble of the present invention, the guidance mechanism is not limited to the above configuration, and may not include the conveying roller and/or the S-shaped guide as long as the guidance mechanism includes the guide roller configured to guide the fiber bundle toward the conveying mechanism.

(6) As for the automated fiber bundle placement apparatus of the preamble of the present invention, in the above embodiment, the automated fiber bundle placement apparatus 1 is configured to perform the placement of the sixteen fiber bundles 2 at the same time. Further, the automated fiber bundle placement apparatus 1 is configured to allot the paths of the sixteen fiber bundles 2 into the four groups each consisting of four paths by the guide mechanism 10 provided upstream of the placing head 6 and to allot the paths divided into the four groups to two groups by the guidance mechanisms 22 (guide rollers 18) provided to the placing head 6 (sub-frame part 35). However, the automated fiber bundle placement apparatus of the preamble of the present invention is not limited to the configuration of allotting the paths in this way.

Specifically, as for the automated fiber bundle placement apparatus, in the present invention, the number of the fiber bundles that can be placed at the same time is not particularly limited. Specifically, the number of the fiber bundles is not limited to sixteen, like the above embodiment. The guide mechanism may also be configured to allot the fiber bundles to the proper number of groups or to guide the fiber bundles toward the placing head (as one group) without allotting the fiber bundles, according to the number of the fiber bundles. Further, the guidance mechanism may also be configured to allot the fiber bundles to the proper number of groups or to guide the fiber bundles toward the conveying mechanism without allotting the fiber bundles, according to the number of the groups of the fiber bundles guided and introduced into the placing head (sub-frame part) by the guide mechanism.

Further, the present invention is not limited to the above-described embodiment and modified embodiments, and can be diversely changed without departing from the gist thereof.

What is claimed is:

1. An automated fiber bundle placement apparatus comprising:

a supply device on which a plurality of bobbins each having a fiber bundle wound thereon is mounted thereto and is configured to deliver the fiber bundle from each of the bobbins;

a placing head configured to perform placement of each of the fiber bundles supplied from the supply device onto a placement die and having a pressing part configured to press the fiber bundles onto the placement die;

a multi-jointed robot on which the placing head is attached thereto and is configured to move the placing head for the placement;

a guide mechanism provided for the multi-jointed robot and configured to guide the fiber bundles from the supply device toward the placing head, wherein the placing head includes:

a plurality of conveying mechanisms each provided on each of paths of the fiber bundles so as to convey the fiber bundles introduced into the placing head toward the pressing part, wherein each of the plurality of conveying mechanisms is configured to convey the fiber bundle;

a plurality of guidance mechanisms each comprising a guide roller for guiding the fiber bundle toward the conveying mechanisms and each provided on each path on an upstream side of the path to the conveying mechanism; and a frame attached to the multi-jointed robot and provided with the conveying mechanisms and the guidance mechanisms, wherein the frame is constituted by a main frame part provided with the conveying mechanisms and attached to the multi-jointed robot and a sub-frame part provided with the guidance mechanisms and detachably attached to the main frame part; and a holding mechanism provided to hold the sub-frame part between the guide mechanism and the placing head in a vertical direction.

2. The automated fiber bundle placement apparatus according to claim 1, wherein the placing head is attached to the multi-jointed robot via a rotation mechanism comprising a rotary part configured to rotationally drive and having the placing head attached thereto, wherein the holding mechanism comprises a holding unit configured to hold the sub-frame part and a support unit configured to support the holding unit with respect to the multi-jointed robot, and wherein the holding unit is attached to the support unit so as to be rotatable around an axis line in the vertical direction.

3. The automated fiber bundle placement apparatus according to claim 1, wherein the sub-frame part has a handle unit for an operator to grip with a hand.

4. The automated fiber bundle placement apparatus according to claim 2, wherein the sub-frame part has a handle unit for an operator to grip with a hand.

* * * * *